(12) United States Patent
Balakrishnan et al.

(10) Patent No.: US 12,248,448 B1
(45) Date of Patent: Mar. 11, 2025

(54) CONFIGURING CHECK CONSTRAINT AND ROW VIOLATION LOGGING USING ERROR TABLES

(71) Applicant: Snowflake Inc., Bozeman, MT (US)

(72) Inventors: Raja Suresh Krishna Balakrishnan, Fremont, CA (US); Ganeshan Ramachandran Iyer, Redmond, WA (US); David Schultz, Piedmont, CA (US); Jian Xu, San Jose, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/451,522

(22) Filed: Aug. 17, 2023

(51) Int. Cl.
*G06F 16/215* (2019.01)
*G06F 11/07* (2006.01)
*G06F 16/23* (2019.01)
*G06F 16/2453* (2019.01)

(52) U.S. Cl.
CPC ........ *G06F 16/215* (2019.01); *G06F 11/0793* (2013.01); *G06F 16/2365* (2019.01); *G06F 16/24545* (2019.01)

(58) Field of Classification Search
None
See application file for complete search history.

(56) References Cited

U.S. PATENT DOCUMENTS

| | | | |
|---|---|---|---|
| 5,790,779 A | 8/1998 | Ben-Natan et al. | |
| 6,366,915 B1 | 4/2002 | Rubert et al. | |
| 10,628,394 B1 | 4/2020 | Gurspan | |
| 11,797,521 B1 | 10/2023 | Vig et al. | |
| 11,921,700 B1 | 3/2024 | Al Mahmood et al. | |
| 2005/0149580 A1 | 7/2005 | Hattori et al. | |
| 2006/0222160 A1 | 10/2006 | Bank et al. | |
| 2008/0071825 A1* | 3/2008 | Guo | G06F 16/48 |
| 2008/0307262 A1 | 12/2008 | Carlin, III | |
| 2010/0161555 A1 | 6/2010 | Nica et al. | |
| 2010/0166008 A1* | 7/2010 | Hashimoto | H04L 5/0048 370/458 |

(Continued)

FOREIGN PATENT DOCUMENTS

WO 2024238722 11/2024

OTHER PUBLICATIONS

"U.S. Appl. No. 18/319,886, Response filed Nov. 1, 2023 to Non Final Office Action mailed Aug. 1, 2023", 10 pgs.

(Continued)

*Primary Examiner* — Christopher J Raab
(74) *Attorney, Agent, or Firm* — Schwegman Lundberg & Woessner, P.A.

(57) ABSTRACT

Provided herein are systems and methods for configuring integrity constraints (including a check constraint) and row violation logging using error tables. An example method includes decoding a query received at a network-based database system. The query includes a command to perform an operation on a base table. An integrity constraint associated with the base table is retrieved. The integrity constraint specifies a desired configuration for the base table. A verification of the integrity constraint is performed to detect erroneous data of the base table that violates the desired configuration. The erroneous data is input into an error table that is configured as a nested object of the base table. A notification that the erroneous data is available in the error table is generated and output.

30 Claims, 15 Drawing Sheets

(56) References Cited

U.S. PATENT DOCUMENTS

| | | | |
|---|---|---|---|
| 2010/0211539 A1* | 8/2010 | Ho | G06F 16/972 |
| | | | 707/602 |
| 2014/0081907 A1* | 3/2014 | Tran | G06F 16/219 |
| | | | 707/E17.005 |
| 2015/0142775 A1* | 5/2015 | Kang | G06F 16/24544 |
| | | | 707/714 |
| 2016/0232200 A1 | 8/2016 | Sherman | |
| 2016/0266920 A1 | 9/2016 | Atanasov | |
| 2018/0096044 A1* | 4/2018 | Koza | G06F 16/27 |
| 2019/0197112 A1 | 6/2019 | Kaplan | |
| 2020/0110792 A1* | 4/2020 | Tsabba | G06F 3/167 |
| 2020/0334268 A1* | 10/2020 | Vasireddy | G06F 16/211 |
| 2021/0294291 A1* | 9/2021 | Murakami | G05B 19/056 |
| 2021/0319030 A1* | 10/2021 | Guiney | G06F 16/24565 |
| 2024/0386010 A1 | 11/2024 | Al Mahmood et al. | |
| 2024/0403276 A1 | 12/2024 | Ahmadi et al. | |

OTHER PUBLICATIONS

"U.S. Appl. No. 18/319,886, Notice of Allowance mailed Nov. 17, 2023", 9 pgs.

AWS, "STL Load Errors", [Online]. Retrieved from the Internet: https: docs.aws.amazon.com redshift latest dg r_STL_LOAD_ERRORS.html, (Accessed online Nov. 2, 2023), 6 pages.

AWS, "STL Loaderror Detail", [Online]. Retrieved from the Internet: https: docs.aws.amazon.com redshift latest dg r_STL_LOADERROR_DETAIL.html, (Accessed online Nov. 2, 2023), 4 pages.

Confluent, "Kafka Connect Deep Dive—Error Handling and Dead Letter Queues", Online Retrieved from the Internet https: www.confluent.io blog kafka-connect-deep-dive-error-handling-dead-letter-queues, (Accessed online Nov. 2, 2023), 29 pages.

Databricks, "Handle bad records and files", [Online]. Retrieved from the Internet: https: docs.databricks.com spark latest spark-sql handling-bad-records.html, (Accessed online Nov. 2, 2023), 3 pages.

Databricks, "Databricks data engineering What is Delta Live Tables", [Online]. Retrieved from the Internet: https: docs.databricks.com data-engineering delta-live-tables index.html, (Accessed online Nov. 2, 2023), 7 pages.

Databricks, "What is Delta Live Tables Manage data quality with Delta Live Tables", [Online]. Retrieved from the Internet: https: docs.databricks.com en delta-live-tables expectations.html, (Accessed online Nov. 2, 2023), 12 pages.

Databricks, "Monitor Delta Live Tables pipelines", [Online]. Retrieved from the Internet: https: docs.databricks.com data-engineering delta-live-tables delta-live-tables-event-log.html#event-log-schema, (Accessed online Nov. 2, 2023), 14 pages.

Google Cloud, "Big Query Jobs View", [Online]. Retrieved from the Internet: https: cloud.google.com bigquery docs information-schema-jobs, (Accessed online Nov. 2, 2023), 17 pages.

Google Cloud, "Introduction to the BigQuery Storage Write API", [Online]. Retrieved from the Internet: https: cloud.google.com bigquery docs write-api, (Accessed online Nov. 2, 2023), 15 pages.

Google Cloud, "Package google cloud bigquery storage v1", [Online]. Retrieved from the Internet: https: cloud.google.com bigquery docs reference storage rpc google.cloud.bigquery.storage.v1#google.cloud.bigquery.storage.v1.AppendRowsResponse, (Accessed online Nov. 2, 2023), 42 pages.

Microsoft Ignite, "Copy Into Transact SQL", [Online]. Retrieved from the Internet: https: docs.microsoft.com en-us sql t-sql statements copy-into-transact-sql?view=azure-sqldw-latestandpreserve-view=true, (Accessed online Nov. 2, 2023), 28 pages.

Single Store, "View and Handle Pipeline Errors", [Online]. Retrieved from the Internet: https: docs.singlestore.com cloud reference troubleshooting-reference pipeline-errors view-and-handle-pipeline-errors , (Accessed online Nov. 2, 2023), 7 pages.

"U.S. Appl. No. 18/319,886, Non Final Office Action mailed Aug. 1, 2023", 16 pgs.

U.S. Appl. No. 18/319,886 U.S. Pat. No. 11,921,700, filed May 18, 2023, Error Tables to Track Errors Associated With a Base Table.

U.S. Appl. No. 18/426,772, filed Jan. 30, 2024, Error Tables to Track Errors Associated With a Base Table.

U.S. Appl. No. 18/326,158, filed May 31, 2023, Built-in Data Quality Monitoring.

"U.S. Appl. No. 18/326,158, Non Final Office Action mailed Sep. 24, 2024", 15 pages.

"U.S. Appl. No. 18/426,772, Notice of Allowance mailed Aug. 16, 2024", 13 pgs.

"International Application Serial No. PCT/US2024/029570, International Search Report mailed Jun. 12, 2024", 3 pgs.

"International Application Serial No. PCT/US2024/029570, Written Opinion mailed Jun. 12, 2024", 7 pgs.

\* cited by examiner

CONFIGURING CHECK CONSTRAINT AND ROW VIOLATION LOGGING USING ERROR TABLES

TECHNICAL FIELD

Embodiments of the disclosure relate generally to data platforms, data providers, data consumers, automated fulfillment, multiple deployments, primary deployments, remote deployments, replication, and, more particularly, to data quality monitoring including systems and methods for configuring integrity constraints (e.g., a check constraint) and row violation logging using error tables.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed.

Cloud-based data warehouses and other cloud database systems or data platforms can be used in connection with data processing tasks using data from different data sources. However, the data coming from the data sources can cause data errors. Ensuring the trustworthiness of the data can be important because enterprise users want the assurance that the data presented is correct and certified. Auditing data periodically can fall short of ensuring the trustworthiness of the data. Moreover, auditing typically involves moving the data out of the data system to perform the audit, which can lead to security and privacy concerns.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
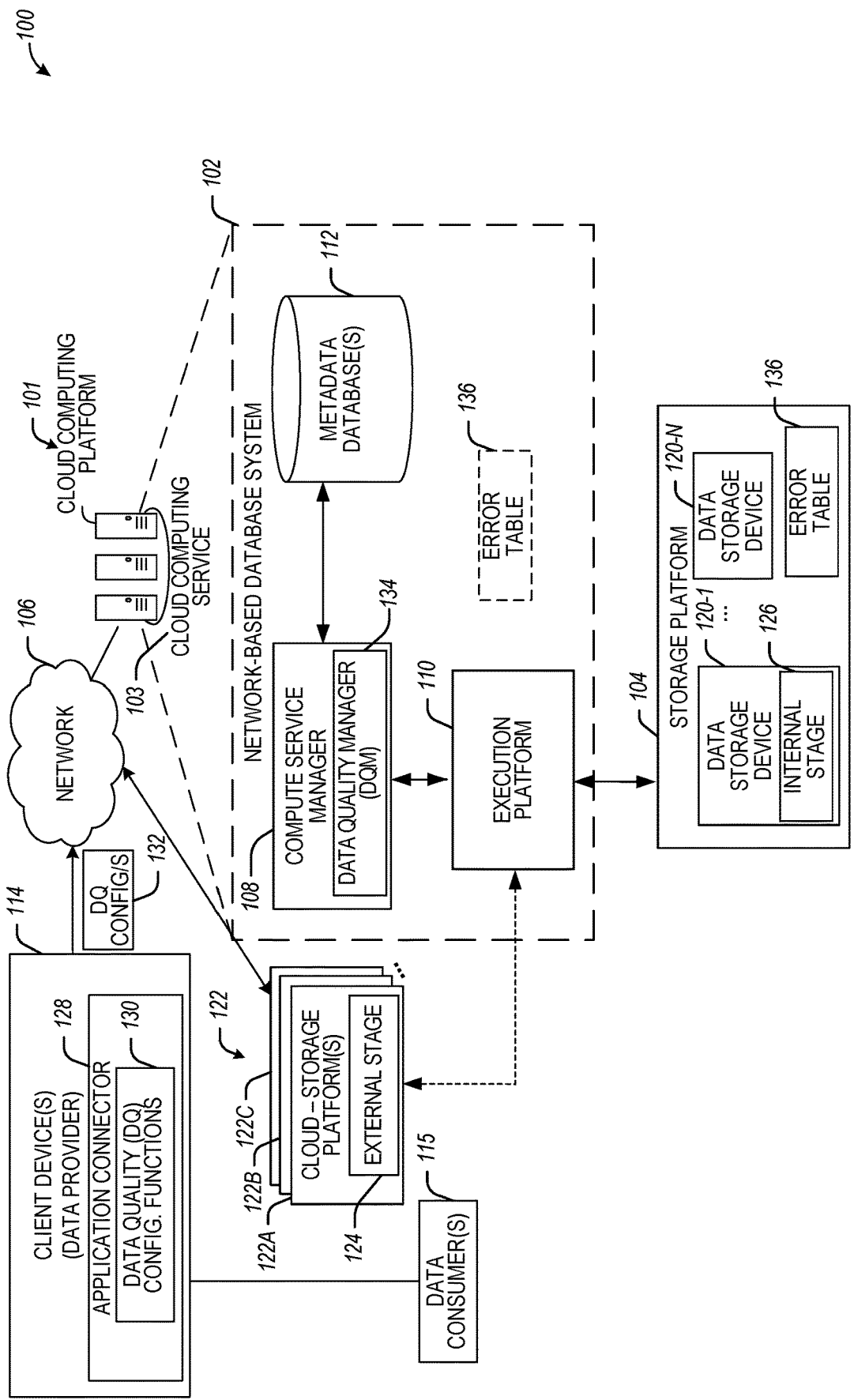
FIG. 1 illustrates an example computing environment that includes a network-based database system in communication with a cloud storage platform, according to some example embodiments.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, extensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a data platform may include one or more databases that are respectively maintained in association with any number of customer accounts (e.g., accounts of one or more data providers), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata (e.g., account object metadata) in association with the data platform in general and in association with, for example, particular databases and/or particular customer accounts as well. Users and/or executing processes that are associated with a given customer account may, via one or more types of clients, be able to cause data to be ingested into the database, and may also be able to manipulate the data, add additional data, remove data, run queries against the data, generate views of the data, and so forth. As used herein, the terms "account object metadata" and "account object" are used interchangeably.

In an implementation of a data platform, a given database (e.g., a database maintained for a customer account) may reside as an object within, e.g., a customer account, which may also include one or more other objects (e.g., users, roles, grants, shares, warehouses, resource monitors, integrations, tags, stages, pipes, network policies, and/or the like). Furthermore, a given object such as a database may itself contain one or more objects such as schemas, tables, views, functions, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

Figure 3:
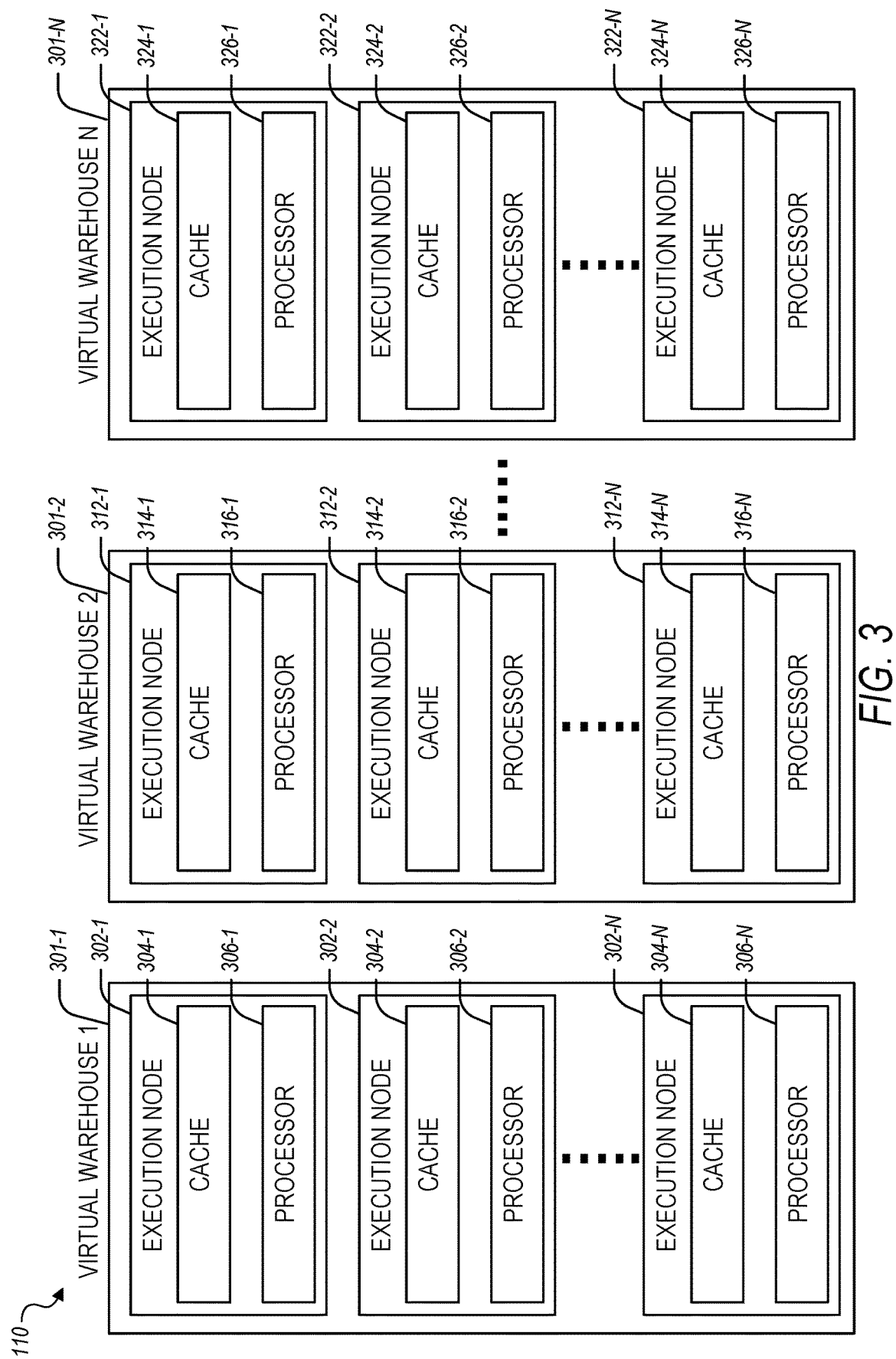
FIG. 3 is a block diagram illustrating components of an execution platform, according to some example embodiments.

As used herein, a tag object (or a tag) indicates a schema-level object that can be assigned to another object. A tag can be assigned an arbitrary string value upon assigning the tag to an object. Tags enable data stewards to track sensitive data for compliance, discovery, protection, and resource usage use cases through either a centralized or decentralized data governance management approach. As used herein, a roles object configures privileges for the users to access at least one target account. For example, a certain role is given access to a certain number of objects or operations (e.g., a role has a certain number of privileges), and a user can be assigned a role. A warehouse object indicates compute resources for executing the workload associated with one or more databases of a data provider. The warehouse object can indicate compute resources associated with one or more virtual warehouses (e.g., as illustrated in FIG. 3). A resource monitor object configures monitoring the usage of compute resources used for executing the workload. For example, a resource monitor object can be used to monitor the usage of a virtual warehouse and generate a notification if such usage is above a threshold.

Techniques for configuring integrity constraints (e.g., a check constraint) and row violation logging using error tables are described. More specifically, a network-based database system includes a data quality manager (DQM) configured to perform data quality-related functions, including prevention functionalities (e.g., to prevent erroneous (also referred to as non-compliant or bad) data from being populated in a database during data ingestion), monitoring functionalities (e.g., to continuously measure and report on data quality metrics using one or more data metric functions), alerting functionalities (e.g., to identify and flag data quality regressions), and remediating functionalities (e.g., to fix data quality errors or other issues detected during the monitoring).

As used herein, the term "check constraint" indicates a type of integrity constraint in structured query language (SQL), which specifies a requirement (e.g., a desired configuration) that has to be met by data in a base table (e.g., by each row of the base table).

As part of the prevention functionalities, the DQM can be configured to perform verification of data (e.g., new data) before ingestion (or during ingestion) to enforce one or more integrity constraints (e.g., a check constraint). For example, a check constraint can be used to verify input data (e.g., a base table) and detect non-compliant (or bad) data that fails to satisfy (or meet) a desired configuration associated with the check constraint. The non-compliant data can be removed from the input data and can be stored in a separate error table.

In some aspects, the DQM can populate the error table not only with the non-compliant data but also with error records corresponding to errors encountered when performing various operations on a base table. In some aspects, the error records can also include contextual information about the errors. In some aspects, the error table can be configured as a nested object of the base table, providing a single location for error records associated with a respective base table allowing users to identify sources of errors and perform appropriate recovery actions more efficiently.

As part of the monitoring functionalities, the DQM can be configured to perform continuous monitoring of the data using scheduled data metric operations (also referred to as data metric functions), which can be defined as schema-level objects. In some aspects, a library of data metric functions can be created and used across an organization (e.g., account) in the network-based database system. In some aspects, the data metric functions can be used across multiple tables and columns, enabling scalability and consistency in the data monitoring capabilities. In some aspects, the DQM can configure the data metric functions to be performed automatically in the background, making them manageable and seamless. In some aspects, a central location per account can be provided for storing the monitored metrics, which can be used for dashboarding, reporting, alerting, and trend analysis. In some aspects, data for the account can be protected from third parties while performing data monitoring operations for security and privacy protection. In some aspects, the DQM can perform on-demand (e.g., ad-hoc) metric monitoring as part of the monitoring functionalities.

The various embodiments that are described herein are described with reference where appropriate to one or more of the various figures. An example computing environment including a DQM configured to perform data quality-related functions is discussed in connection with FIGS. 1-3. An overview of the data quality-related functions performed by the DQM is provided in connection with FIG. 4. A more detailed description of the prevention functionalities performed by the DQM using error tables is provided in connection with FIG. 5-FIG. 9. A more detailed description of the monitoring functionalities performed by the DQM using data metric functions is provided in connection with FIG. 10-FIG. 13. An example method for integrity constraint verification using an error table is discussed in connection with FIG. 14. A more detailed discussion of example computing devices that may be used with the disclosed techniques is provided in connection with FIG. 15.

FIG. 1 illustrates an example computing environment 100 that includes a database system in the example form of a network-based database system 102, according to some example embodiments. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g., SQL queries, analysis, etc.), as well as other processing capabilities (e.g., data quality-related functionalities described herein). The cloud computing platform 101 may include a three-tier architecture: data storage (e.g., storage platforms 104 and 122), an execution platform 110 ("XP") (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types-on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, a notification to a user may be understood to be a notification transmitted to the client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some aspects, client device 114 is a device associated with an account of a user (e.g., a data provider) of the network-based database system 102, which user can be associated with an account of another user (e.g., data consumer 115).

In some embodiments, the client device 114 is configured with an application connector 128, which may be configured to perform data quality configuration functions 130. For example, client device 114 can use the data quality configuration functions 130 to generate data quality configurations 132. The data quality configurations 132 can be communicated to the network-based database system 102 (e.g., to the DQM 134 within the compute service manager 108) via network 106. In some aspects, DQM 134 can use the data quality configurations 132 to further configure one or more integrity constraints (e.g., one or more check constraints) as well as an error table 136 which can be used in connection with data quality-related functions discussed herein.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata (e.g., account objects used in connection with a share object associated with a listing of the data provider).

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122A, 122B, . . . , 122C (collectively, cloud storage platforms 122). The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, the compute service manager 108 includes a DQM 134. The DQM 134 comprises suitable circuitry, interfaces, logic, and/or code and is configured to perform the disclosed data quality-related functionalities discussed herein, including prevention functionalities using error table 136 (e.g., prevent erroneous (also referred to as non-compliant or bad) data from being included in a base table or other ingested data), monitoring functionalities (e.g., to continuously measure and report on data quality metrics), alerting functionalities (e.g., to identify and flag data quality regressions), and remediating functionalities (e.g., to fix data quality issues).

In some aspects, DQM 134 uses the error table 136 to store the erroneous data as part of performing the prevention functionalities. In some aspects, error table 136 can be maintained within the storage platform 104. In other aspects, the error table can be maintained within the network-based database system 102 (e.g., as part of the compute service manager 108) or other locations.

Error tables (e.g., error table 136), as described in further detail below, can be used to track errors. For example, error table 136 can be used for data quality checks and check constraint validations. In some aspects, an error table may be attached to its corresponding base table as a nested object. In some aspects, an error table can be a child object of a parent base table. That is, each base table may have a corresponding error table. In some examples, an error table may be automatically created for a base table using the syntax for the base table for easy discovery by the user, as described in further detail below. Also, when a base table is replicated, the error table may be replicated, too. When a base table is deleted, the error table may be deleted, too. In some examples, users may be able to enable and disable error tables. For example, users may enable or disable an error table for a base table using an alter command. Enabling error tables at the schema, database, or account level can enable error tables for all base tables in the hierarchy.

Additional functionalities associated with the DQM 134 (including error table 136) are discussed in connection with FIG. 4-FIG. 14.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
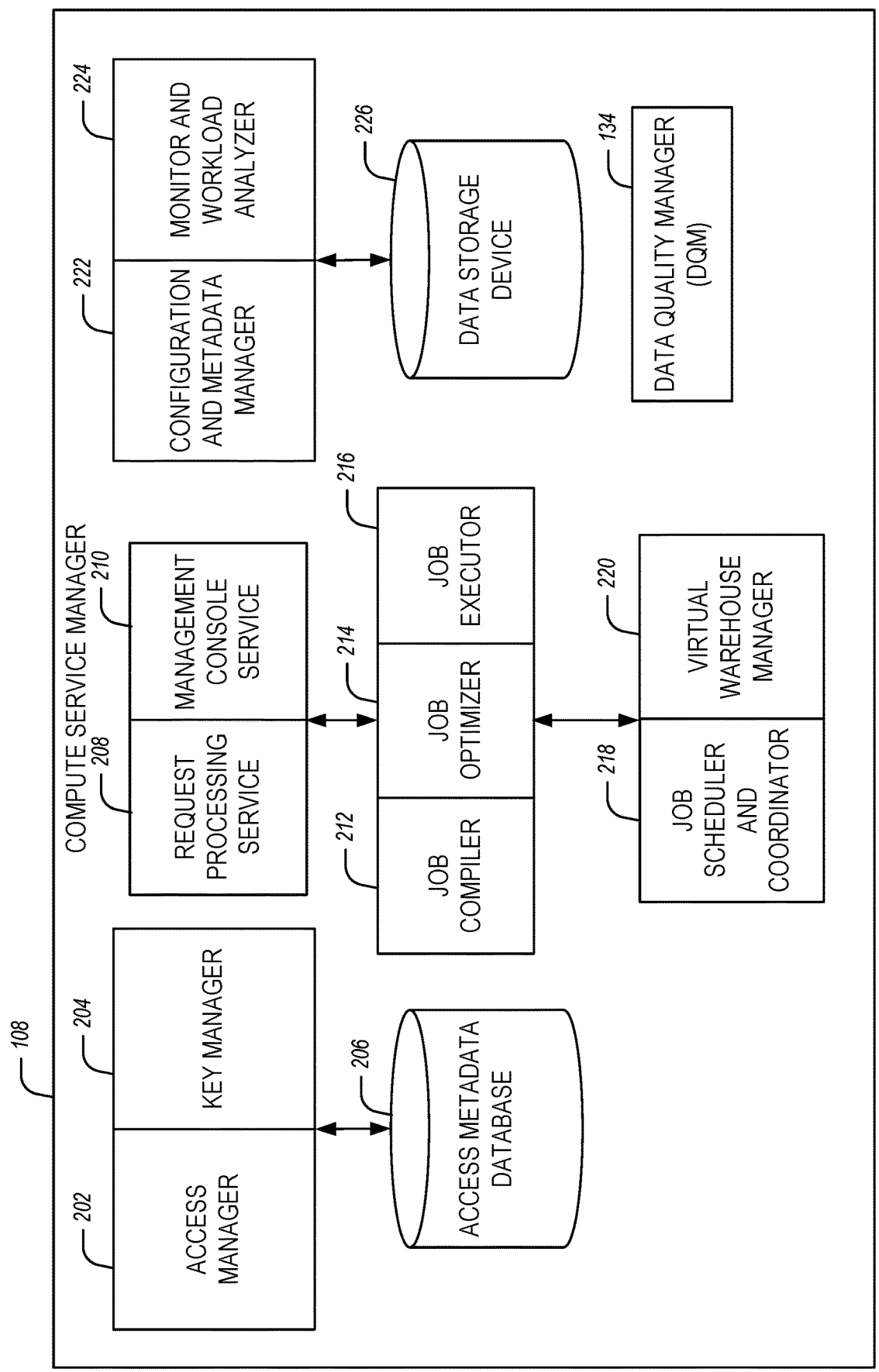
FIG. 2 is a block diagram illustrating the components of a compute service manager using a data quality manager (DQM), according to some example embodiments.

FIG. 2 is a block diagram illustrating components of the compute service manager 108 using a DQM, according to some example embodiments. As shown in FIG. 2, the compute service manager 108 includes an access manager 202 and a key manager 204 coupled to an access metadata database 206, which is an example of the metadata database(s) 112. Access manager 202 handles authentication and authorization tasks for the systems described herein. The key manager 204 facilitates the use of remotely stored credentials to access external resources such as data resources in a remote storage device. As used herein, the remote storage devices may also be referred to as "persistent storage devices" or "shared storage devices." For example, the key manager 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the key manager 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes configuration and metadata manager 222, which manages the information related to the data stored in the remote data storage devices and the local buffers (e.g., the buffers in execution platform 110). Configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

As previously mentioned, the compute service manager 108 includes the DQM 134 configured to perform the disclosed compatibility verification functionalities associated with the auto-fulfillment of a listing of the data provider.

FIG. 3 is a block diagram illustrating components of the execution platform 110, according to some example embodiments. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
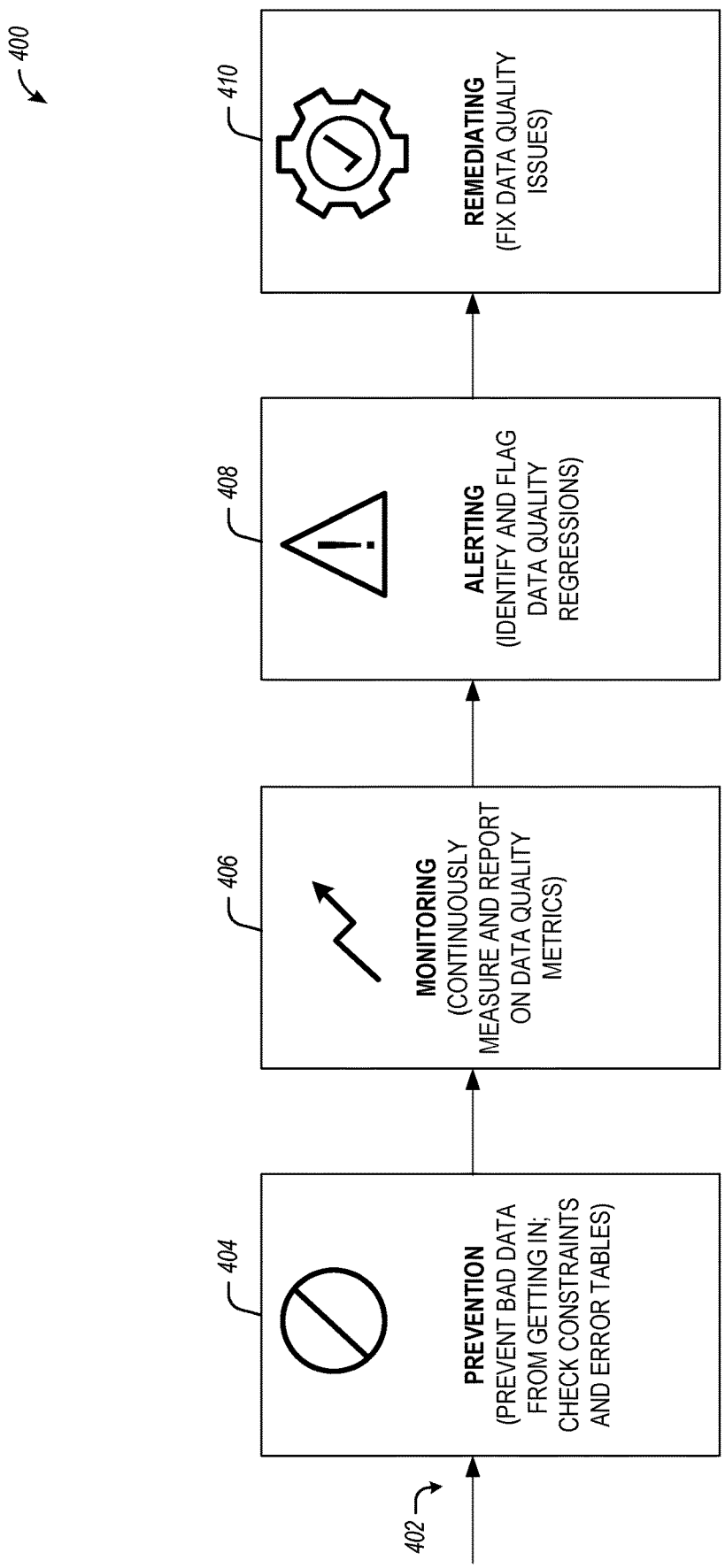
FIG. 4 illustrates a diagram of a data quality flow that can be performed by the DQM of FIG. 2, according to some example embodiments.

FIG. 4 illustrates a diagram of a data quality flow 400 which can be performed by the DQM of FIG. 2, according to some example embodiments. Referring to FIG. 4, data quality flow 400 can be applied to data 402 which is available within the network-based database system 102 (e.g., newly ingested data or other types of data).

In some embodiments, data quality flow includes prevention functionalities 404. For example, DQM 134 is configured to perform the prevention functionalities 404 to prevent erroneous (also referred to as non-compliant or bad) data from being populated in a database during data ingestion. In some aspects, DQM 134 uses error table 136 in connection with the prevention functionalities 404. For example, DQM 134 can use error table 136 to store erroneous data detected in connection with integrity constraint verification of data. Additional configurations associated with the prevention functionalities 404 performed by DQM 134 are discussed in greater detail in connection with FIG. 5-FIG. 9 and FIG. 14.

In some embodiments, DQM 134 is further configured to perform monitoring functionalities 406 in connection with data generated after the prevention functionalities 404 have been completed. For example, DQM 134 can perform continuous measurement and report on data quality metrics using one or more data metric functions. Additional configurations associated with the monitoring functionalities 406 performed by DQM 134 are discussed in greater detail in connection with FIG. 10-FIG. 13.

In some embodiments, DQM 134 is further configured to perform alerting functionalities 408 (e.g., to identify and flag data quality regressions), and remediating functionalities 410 (e.g., to fix data quality errors or other issues detected during the monitoring functionalities 406).

Figure 5:
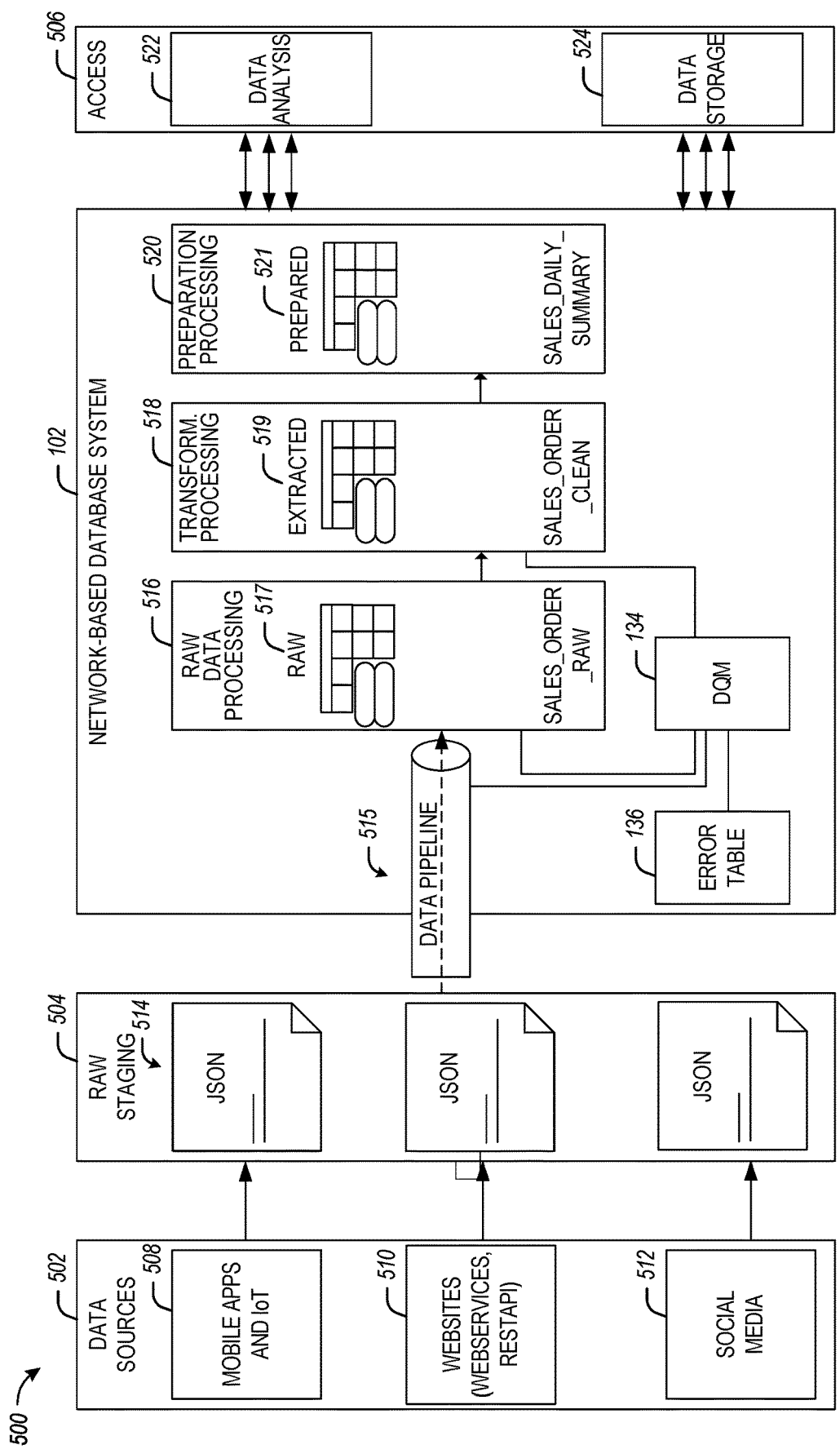
FIG. 5 illustrates a diagram of data quality management using the DQM of FIG. 2 when ingesting data in the network-based database system of FIG. 1, according to some example embodiments.

FIG. 5 illustrates diagram 500 of data quality management using the DQM of FIG. 2 when ingesting data in the network-based database system of FIG. 1, according to some example embodiments. Referring to FIG. 5, the data quality-related functionalities associated with FIG. 5 can be performed, at least in part, by the DQM 134 of the network-based database system 102.

More specifically, data can be communicated to the network-based database system 102 from data sources 502, which can include mobile applications and Internet-of- Things (IoT) sources 508, websites 510, social media sources 512, etc. Data from data sources 502 is initially processed and converted to structured data during raw staging 504. For example, data from data sources 502 is converted to JavaScript object notation (JSON) data 514.

JSON data 514 is received by the network-based database system 102 via data pipeline 515. In some aspects, JSON data 514 is initially received and stored as raw data 517 during the raw data processing stage 516. The raw data is then further processed during the transformation processing stage 518 to generate transformed data 519 (also referred to as extracted data). The transformed data is further processed during the preparation processing stage 520 to generate prepared data 521. The prepared data 521 is received by accessing stage 506 for further analysis (e.g., using data analysis functionalities 522) and storage (e.g., at data storage 524 which can include storage platform 104 and cloud-storage platforms 122).

In some embodiments, the network-based database system 102 includes DQM 134 configured to perform data quality-related functionalities using data received via the data pipeline 515 (e.g., JSON data 514). In some aspects, DQM 134 is configured to perform the disclosed data quality-related functionalities to the incoming data while it is in the data pipeline 515, on raw data 517 generated during the raw data processing stage 516, and/or to transformed data 519 generated during the transformation processing stage 518.

In some aspects, DQM 134 performs the prevention functionalities 404 on such data using the error table 136. In some embodiments, DQM 134 performs the prevention functionalities (e.g., integrity constraint verification and logging erroneous data in error table 136) during the transformation processing stage 518. More specifically, the transformation processing stage 518 is an opportunity to prevent erroneous (e.g., non-compliant) records from entering the "clean" dataset (e.g., the transformed data 519). The following data quality-related functions can be performed by the DQM 134:

(a) Declaratively specify a quality condition (or integrity constraint) (e.g., a check constraint) and action when the data in the base table (e.g., table sales_order_clean referenced in FIG. 5) does not meet the criteria (e.g., a desired configuration) of the integrity constraint.

(b) Monitor records that fail the condition for each insertion/update operation.

(c) Start remediation actions for failed records (e.g., erroneous data such as base table rows that fail the desired configuration of the integrity constraint). The remediation actions can include one or more of the following: logging the erroneous data in the error table 136, re-running a query operation associated with the incoming data received via the data pipeline 515, cleansing and merging the failed records or canceling the query operation. DQM 134 can also generate and output a notification of any of the performed remediation actions or obtain user input to select one of the remediation actions to be performed.

In some embodiments, integrity constraints on tables can be categorized as "informational" where the constraint is used by the compiler/optimizer, and "enforced" (or verified) where the constraint is used to validate the data added to the object to enforce quality and referential integrity. In some embodiments, DQM 134 performs the integrity constraint enforcement (or verification), including check constraint enforcement, on data in different types of tables, including dynamic tables, online analytical processing (OLAP) tables, and online transaction processing (OLTP) tables.

Upon detecting a violation of an integrity constraint (or any other type of constraint), DQM 134 logs the violation as well as any related additional data in the error table 136. In some aspects, the additional data stored in the error table 136 can include one or more of the following: the integrity constraint (e.g., the check constraint), an ID of the constraint, and a check constraint expression (in case a check constraint is used).

In some embodiments, DQM 134 can also configure one or more of the following types of constraints (in addition to check constraint): Not Null (a constraint that a column must not assume the null value), Unique Constraint (a constraint to ensure that the data contained in a column, or a group of columns, is unique among all the rows in the table), Primary Key Constraint (to ensure that the values in the primary key columns must both be UNIQUE and NOT NULL), and Foreign Key Constraint (to specify that the values in a column (or a group of columns) must match the values appearing in some row of another table.

In some aspects, a check constraint can be configured based on one of the following two options:

(a) Option #1: Named attribute of a table or a column is used. This configuration is consistent with the ANSI SQL specification and is compatible with legacy vendors (e.g., Teradata, Oracle, SQL Server) for easy migrations.

Constraints can be defined per table.

The following check constraint syntax can be used for configuring check constraint for Option #1: [CONSTRAINT<constraint_name>]CHECK (<boolean expression>).

(b) Option #2: Check constraint can be configured as an independent named object. This configuration is similar to a policy (e.g., a policy can be created once and attached to many tables). In this case, a constraint can be created once and assigned to many tables/columns. This configuration is not an ANSI SQL standard and may result in compatibility issues with workloads migrations from legacy vendors.

In some embodiments, check constraint can be supported in the following manner for a column or a table:

(a) For a column. A constraint can be created in line with the column definition during the creation of the table or the "alter table add column." In some aspects, only one in-line check (with the column definition) constraint is supported per column.

(b) For a table. Multiple table-level check constraints can be created on a given table. In some aspects, a table-level check constraint can refer to one or many columns in the same table.

The following are some examples of configuring a check constraint:

(a) Check constraint creation during table creation:
create or replace table t1(
c1 string constraint c_1 check (c1 between 0 and 200)
);

(b) Check constraint creation during "add a new column":
alter table t1 add column c2 string constraint c_2 check (c2 between 0 and 200);

(c) Multiple columns check constraint, in DDL alter:
alter table t1 add constraint c_3 check (c1<c2); and (d) Constraint on single column c1, column c1 has 2 single column constraints, in DDL alter:
alter table t1 add constraint c_1_check_2 check (c1>10).

In some aspects, DQM 134 can configure integrity constraints (e.g., check constraints) for the following data object types: tables, table columns, dynamic tables (including column), iceberg tables (e.g., including data in an open source data storage format), data definition language (DDL) objects, create table as select (CTAS) objects, data manipulation language (DML) objects, Copy Into objects, data pipelines, and data ingesting operations.

In some embodiments, the following property can be supported by check constraints: ENFORCED/NOT ENFORCED. This option allows the user to explicitly specify whether the constraint must be enforced or just used for information. In some aspects, both keywords (enforce and not enforced) can be supported. When a table is altered with a constraint, the constraint can be first validated against all existing records. If validation is successful, the constraint will be enforced for all new records. In some aspects, when the constraint is deactivated using the Not Enforced keyword, new records may not be checked. However, when the constraint is activated again, all existing records will be validated against the constraint.

In some embodiments, the following syntax can be used to modify constraint properties: ALTER TABLE<tabname>ALTER {CONSTRAINT<name>|CHECK (<boolean expression>)} {[[NOT] ENFORCED]}.

Examples of constraint modification include:
(a) Modify constraint to not be enforced: ALTER TABLE T1 ALTER CONSTRAINT C_1 NOT ENFORCED; and
(b) modify constraint to be enforced: ALTER TABLE T1 ALTER CONSTRAINT C_1 ENFORCED.

In some aspects, the check constraint is configured as a Boolean expression that can only refer to columns in a single table (e.g., check (c1 is not null) or check (c1>0 and c2<0)).

In some embodiments, the following configurations can be used to validate whether a check constraint applies to a table. When an existing table has data and a check constraint is assigned to it (e.g., using the ALTER command), all existing rows have to satisfy the constraint. If any row violates the constraint, the DDL command is failed to be compliant with ANSI standards for check constraints. The following are example options for validation:
(a) Option #1: Block data writes until validation is complete. Use table locks to prevent new data from being written to the table until validation of existing records is completed.

In some aspects, the following optimization can be configured: lock the table only when existing rows are validated:
a.1) Block DMLs (proposed, start with a.1).
a.1.1) Do not block delete.
a.1.2) No concurrent DDL for constraints allowed.
a.2) Enforce on new rows (not ANSI compliant).
a.3) No blocking, no enforcement. An optimized lock can be used.
(b) Option #2: Allow data writes before validation is complete.
Immediately enforce the constraints on new rows inserted by DMLs assuming that the DDL will succeed. Validation for existing rows can be performed in the background. If bad rows are found, indicate validation failed in table_constraints view. If no bad rows are found, indicate validation is successful in table_constraints view.
(c) Option #3: No Blocking DDL for validation. Enforce check constraints after validating all existing rows and rows from the in-flight DML/copy command.

In some embodiments, when a table has been configured with a check constraint and data is inserted into it, DQM 134 can enforce the constraint to ensure that all rows satisfy the constraint. DQM 134 can follow the ANSI standard for check constraints and validating the constraint expression inline with the DML command. DQM 134 can fail the command if any row violates the constraint in the following manner:
(a) DMLs: Provide options to fail the command or skip the bad rows (additional details below); (b) COPY INTO: Provide options to fail the command or skip the bad rows (additional details below); and (c) Data pipeline: Provide the option to skip the bad rows (additional details below). Aborting DMLs may not be an option for tables associated with a data pipeline.

The following configuration can be used by DQM 134 to enforce a check constraint with ON VIOLATION action.
(a) Send rows that violate constraint to a predefined error table (e.g., error table 136). For example ON VIOLATION {DROP ROW|LOG IN ERROR TABLE|ABORT}. The following behavior is configured: complete DML operation successfully for validated rows, bad rows (e.g., erroneous or non-compliant data) are inserted into the error table, and bad rows are not inserted into the target table. (b) Abort the operation when a row violates a constraint. For example ON VIOLATION {DROP ROW|LOG IN ERROR TABLE|ABORT}. In some aspects, a DML operation fails when an invalid row is present.

In some embodiments, the following syntax can be used for the "On Violation" action: ON VIOLATION<ACTION>. For example: alter table t1 add constraint check_1 check (c1<c2) ON VIOLATION LOG IN ERROR TABLE. The following configuration options may be used:
(a) Option #1: Separately specify an action for each constraint. Example: check (n>0) on violation log in error table. (b) Option #2: Specify action as a table property (e.g., applies to all enforced constraints of a table). Example: alter table <T1> on constraint on violation log in error table. (c) Option #3: Specify action in DML/COPY command. Example: insert into <T1> . . . on constraint on violation log in error table; and copy into <T1> . . . on constraint on violation log in error table.

Figure 6:
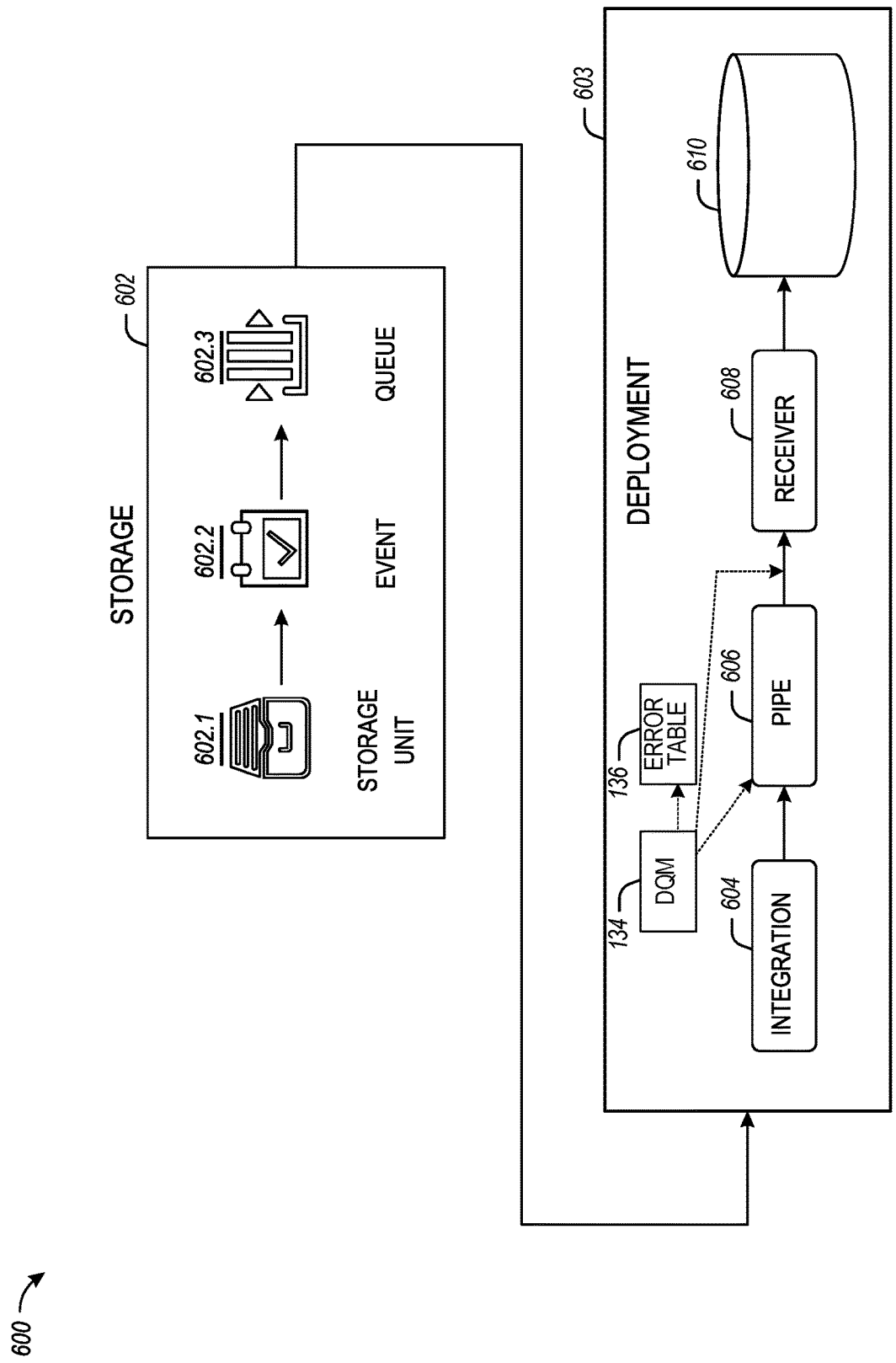
FIG. 6 is a simplified block diagram of a system for automated data ingestion using a DQM, according to some example embodiments.

FIG. 6 is a simplified block diagram of a system 600 for automated data ingestion using a DQM, according to some example embodiments. System 600 may include a storage 602, which may be provided as cloud storage (e.g., Amazon S3 storage, Azure storage, GCP storage, etc.). Storage 602 may include client data to upload to the data warehouse.

Storage 602 may store files (or data) to be ingested into database 610. In some embodiments, storage 602 may include a storage unit 602.1, an event block 602.2, and a queue 602.3. System 600 may also include a deployment 603 to ingest data in database 610. Deployment 603 may include multiple components such as a metadata store/DB, a front-end layer, a load balancing layer, a data warehouse, etc., as discussed above concerning FIGS. 1-3. Deployment 603 may be provided as public or private deployments. A public deployment may be implemented as a multi-tenant environment, where each tenant or account shares processing and/or storage resources. For example, in a public deployment, multiple accounts may share a metadata store, a front-end layer, a load balancing layer, a data warehouse, etc. A private deployment, on the other hand, may be implemented as a dedicated, isolated environment, where processing and/or storage resources may be dedicated.

Deployment 603 may be communicatively coupled to the queue 602.3 and may include an integration 604, a pipe 606 (e.g., a data pipeline), and a receiver 608. Integration 604 may be configured to receive a notification when new data becomes available in queue 602.3. For example, the queue may include a pool of Simple Queue Service™ (SQS) queues as part of an Amazon Web Services™ S3 bucket. The pool of SQS queues may be provided to client accounts to add user files to a bucket. A notification may be automatically generated when one or more user files are added to a client account data bucket. A plurality of customer data buckets may be provided for each client account. The automatically generated notification may be received by integration 604.

For example, integration 604 may provide information relating to an occurrence of an event in queue 602.3. Events may include the creation of new data, update of old data, and deletion of old data. Integration 604 may also provide identification information for a resource associated with the event, e.g., the user file that has been created, updated, or deleted. The Integration 604 may communicate with queue 602.3 because the integration 604 may be provided with credentials for queue 602.3, for example by an administrator and/or user. In an embodiment, integration 604 may poll queue 602.3 for notifications.

Integration 604 may deliver the notification to pipe 606, which may be provided as a single pipe or multiple pipes. Pipe 606 may store information relating to what data and the location of the data for automatic data ingestion related to queue 602.3. The receiver 608 may perform the automated data ingestion, and then store the ingested data in the database 610.

In some embodiments, deployment 603 further includes DQM 134 and error table 136. In some aspects, DQM 134 can perform disclosed data quality-related functions (e.g., enforcing integrity constraints such as a check constraint using error table 136) on data available in pipe 606 or data being communicated to the receiver 608.

Figure 7:
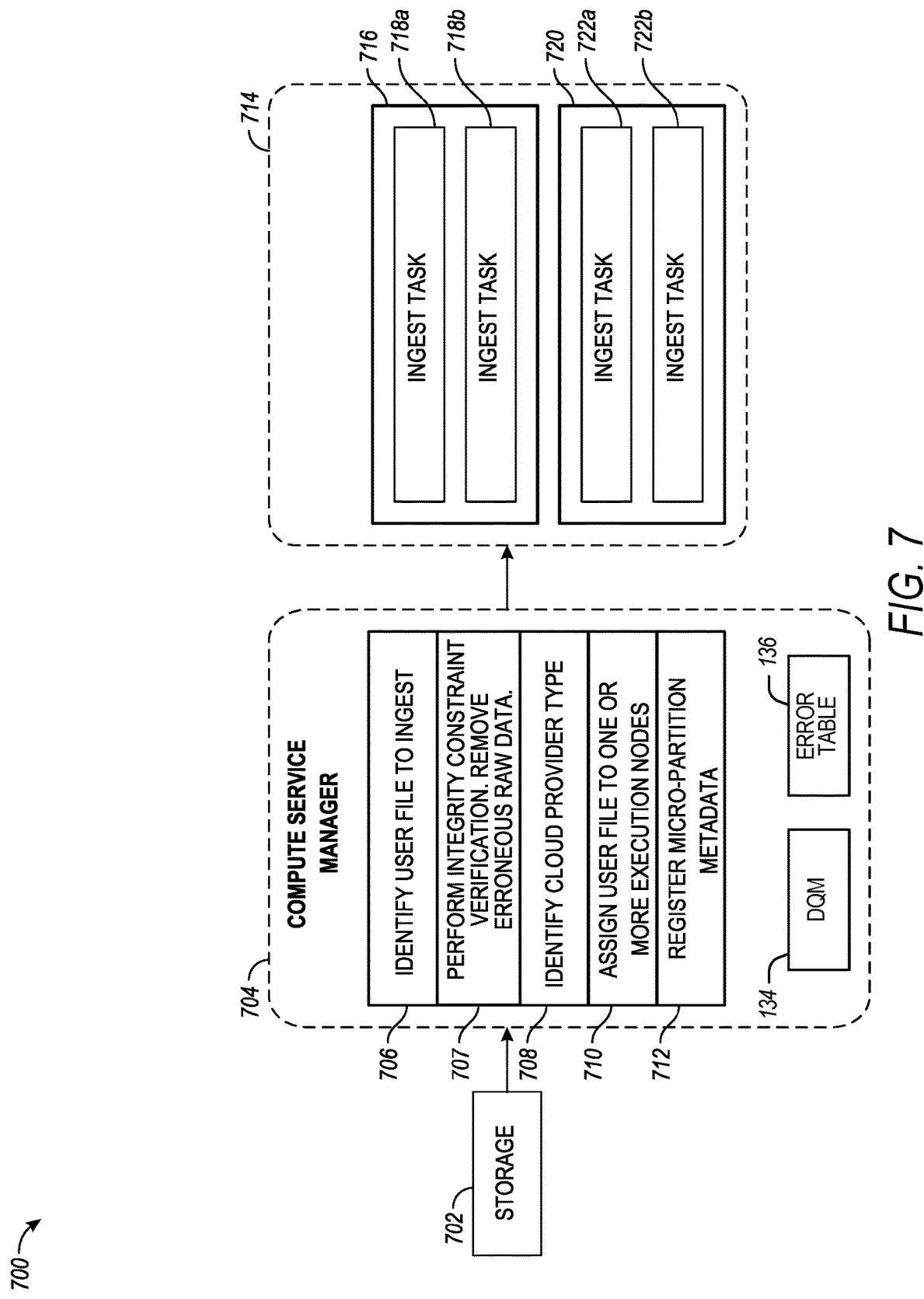
FIG. 7 is a schematic block diagram of a process of ingesting data into a database using a DQM to verify integrity constraints and log row violations in an error table, according to some example embodiments.

FIG. 7 is a schematic block diagram of process 700 of ingesting data into a database using a DQM to verify integrity constraints and log row violations in an error table, according to some example embodiments. Process 700 begins and storage 702 sends an ingest request, such as a notification. Storage 702 may directly or indirectly communicate with the database system to send in the ingest request. In some embodiments, the ingest request is a notification provided by a third-party vendor storage account, or the ingest request may arise from a compute service manager polling a data lake associated with the client account to determine whether any user files have been added to the client account that has not yet been ingested into the database. The notification includes a list of files to insert into a table of the database. The files are persisted in a queue specific to the receiving table of the database.

The ingest request is received by a compute service manager 704. In some aspects, the compute service manager 704 (which can be an example of the compute service manager 108 in FIG. 1) is configured with DQM 134 performing data quality-related functionalities using error table 136. The compute service manager 704 identifies at operation 706 a user file to ingest. At operation 707, DQM 134 performs integrity constraint verification (e.g., using the disclosed techniques) and removes erroneous data (e.g., non-compliant or bad data is removed and stored in error table 136).

At operation 708, the compute service manager 704 identifies a cloud provider type associated with the client account. At operation 710, the compute service manager 704 may assign the user file to one or more execution nodes, based at least in part on the detected cloud provider type, and registers (at operation 712) micro-partition metadata associated with a database table after the file is ingested into a micro-partition of the database table. The compute service manager 704 provisions one or more execution nodes (e.g., execution nodes 716 and 720 of an execution platform 714) to perform one or more tasks associated with ingesting the user file after the integrity constraints have been enforced. Such ingest tasks 718a, 718b, 722a, and 722b include, for example, cutting a file into one or more sections, generating a new micro-partition based on the user file, and/or inserting the new micro-partition in a table of the database.

Process 700 begins an ingest task that is executed by a warehouse (e.g., one of the warehouses 301-1 to 301-N). The ingest task may pull user files from the queue for a database table until it is told to stop doing so. The ingest task may periodically cut a new user file and add it to the database table. In one embodiment, the ingest process is "serverless" in that it is an integrated service provided by the database or compute service manager 704. That is, a user associated with the client account need not provision its warehouse or a third-party warehouse to perform the ingestion process. For example, the database or database provided (e.g., via instances of the compute service manager 704) may maintain the ingest warehouse that then services one or more or all accounts/customers of the database provider.

In some embodiments, there may be more than one ingest task pulling from a queue for a given table, and this might be necessary to keep up with the rate of incoming data. In some embodiments, the ingest task may decide the time to cut a new file to increase the chances of getting an ideal-sized file and avoid "odd-sized" files that would result if the file size was lined up with one or more user files. This may come at the cost of added complexity as the track line number of the files consumed must be tracked.

Errors during auto ingestion and other operations, such as copy commands, streaming ingests, materialized views, and external tables, can occur. For example, one or more input rows can fail to load due to parsing or transform errors, or the DQM 134 can detect erroneous (or non-compliant) data during integrity constraint (e.g., check constraint) verification and enforcement. In some conventional systems, a load history can have information about the file and an error message but is left to the user to figure out which rows failed to load. This lack of information can become cumbersome for users when there are only a handful of bad rows in a file with several thousand valid rows.

In the streaming ingest example, the data system may want to ingest the valid or good rows and possibly ignore the bad rows causing the errors. In the materialized views example, dynamic materialized views can have input records that lead to errors during projection or in predicates, such as type casting errors or invalid arithmetic operations.

Next, techniques to track errors, such as failed rows, separately are described. With these techniques, the tracked errors, such as failed rows, can be stored in error table 136 and can be easily accessible to the user so that automated or manual recovery actions can be appropriately taken to address the errors. In this regard, error table 136 can be used to track errors. For example, error table 136 can be used for data quality checks and check constraint validations. In some aspects, error table 136 may be attached to its corresponding base table as a nested object. In some aspects, error table 136 can be a child object of a parent base table. That is, each base table may have a corresponding error table. In some embodiments, error table 136 may be automatically created for a base table using the syntax for the base table for easy discovery by the user, as described in further detail below. In some aspects, when a base table is replicated, its corresponding error table may be replicated, too. In some aspects, when a base table is deleted, its corresponding error table may be deleted, too. In some embodiments, users may be able to enable and disable error tables (e.g., via the data quality configurations 132). For example, users may enable or disable an error table for a base table using an alter command. Enabling error tables at the schema, database, or account level can enable error tables for all base tables in the hierarchy.

Figure 8:
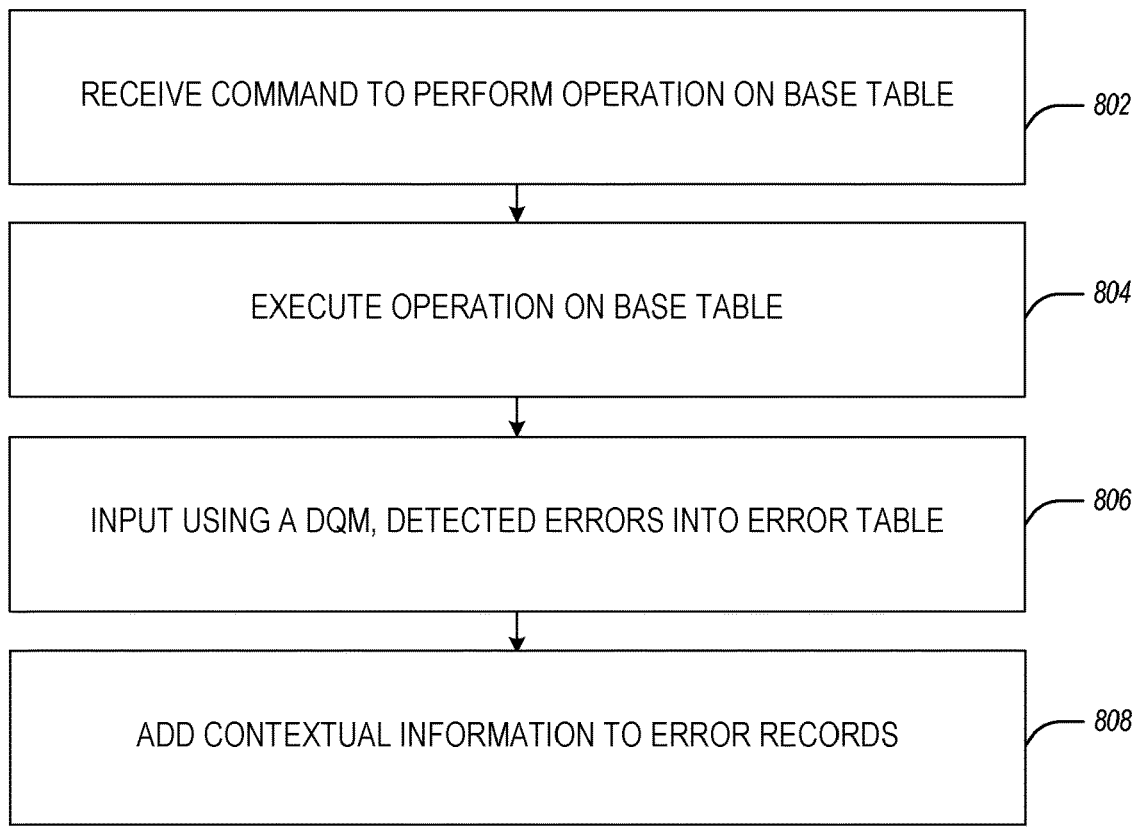
FIG. 8 is a flow diagram of a method for tracking errors using an error table, according to some example embodiments.

FIG. 8 is a flow diagram of method 800 for tracking errors using an error table, according to some example embodiments. Method 800, for example, may be performed by one or more compute service managers (e.g., by a DQM) and execution platforms, as described above.

At operation 802, a command to perform an operation on a base table is received. The operation may include a variety of different data operations, such as auto-ingestion, copy command, streaming ingests, materialized views, external tables, etc. For example, the command may be to perform auto-ingestion of some files stored outside the data system into a base table stored in the data system using auto ingestion techniques described above concerning FIG. 6 and FIG. 7. That is, a compute service manager, as described herein (e.g., compute service manager 704), may receive notifications of files to be ingested and create a query plan for ingesting those files. The compute service manager may assign ingest tasks to execution nodes of one or more execution platforms (XPs) as described above.

At operation 804, the command operation may be executed on the base table. In an auto-ingestion example, the XPs may start executing the ingest tasks for an auto-ingestion command. At operation 806, one or more errors from the execution of the operation may be detected and input into an error table associated with the base table. Consider an example: an auto-ingestion operation for ingesting one hundred rows into the base table, but 5 rows encountered an error in the ingestion process. For each row that encountered an error and could not be ingested, a corresponding row entry is made in the error table (e.g., error record data).

At operation 808, contextual information (also referred to as diagnostic information) is added to the error records. Contextual information can be used by the user to determine information about the source of the error and to determine recovery actions to resolve the error. The recovery actions may be manual or automatic. Contextual information can also be used to understand broader trends about the errors and identify the source of the errors.

The error table may be stored as attached to the base table using storing techniques described herein, for example concerning FIGS. 1-3. The error table may be a nested table of the associated base table. In some examples, respective base tables may each have a corresponding error table attached. Hence, the error table may be managed by the data system, and users do not have to handle setting up and managing the error tables. Moreover, because the error tables are managed by the data system, role-based access control (RBAC) techniques can be employed to provide underlying permissions to the error table so that unauthorized users cannot access the error table and information about the bad rows associated with the base table. The error table can provide a transactional and consistent view of errors. The error table can record errors from different operations performed on a base table so that it provides an accessible location to deal with error records generated from different operations and features (e.g., copy, auto-ingestion, materialized tables, streaming ingest, external tables).

In some aspects, the network-based database system 102 can manage the schema of the error tables. In addition to the error record, contextual information can be added by the data system (e.g., compute service manager) to provide additional information regarding the context and source of the error.

The schema of the error table can include a timestamp value associated with an error record, which provides an event timestamp. The schema of the error table can include a source value (e.g., source column), which may include a string value describing the operation which led to the error record (e.g., copy, auto-ingestion, materialized tables, streaming ingest, external tables). The schema of the error table can include source identification (source_id), which may include a number ID for the identifier of the source if applicable (null if not applicable). For example, for auto-ingestion, the source_id may correspond to the pipe identification used for ingestion (pipe_id).

The schema of the error table can include a query identification value (query_id), which may be a string value for operations corresponding to queries. For operations not corresponding to queries, such as auto-ingestion, a null value may be set for the query_id. The schema of the error table can include a session identification value (session_id), which may include a number value for the session in which the operation was executed if appropriate. Other identification information may be included, such as warehouse name, warehouse_id, database name, database_id, schema name, schema_id, table name, table_id (relative id of an object (table or materialized table)), user name, user_id (relative id of user executing operation), and user_role (role used for executing the operation). For example, the user_id for a materialized table may be the owner of the materialized table, for auto-ingestion may be null, for a copy command may be the user executing the command, and for streaming ingest may be the user performing INSERT.

In some aspects, the schema of the error table can further include information associated with an integrity constraint (e.g., a check constraint) enforced by the DQM. Such information may include one or more of the following: the check constraint, an ID of the check constraint, and the check constraint expression.

The schema for the error table can include a message, which may be a string value displaying an error message for the user. The schema for the error table can include error record data, which may be a variant value and may include the failed record (e.g., includes relevant column data). The failed record may be a base-64 encoded value if the record is unable to be parsed. In some examples, the failed record may be truncated if beyond a specified length.

The schema for the error table can include column information. The column information may include an error column, which may be a string value for the name of the column that had the failed input (bad input). The column information may include an error column value, which may be a variant value of the offending column that resulted in the failure. The schema for the error table can include a record metadata field, which may be a variant value, and include additional source-specific metadata for the record. For example, for auto-ingestion and copy command, it can include a file path and row number; for a materialized table, it can include metadata row identification, metadata action, and index of projection in the plan for the materialized table; for streaming ingest, it can include channel identification.

As mentioned above, the error table may be attached to the base table. Hence, the discovery of the error table can be straightforward since the error table maps 1:1 with the base table. RBAC rules from the base table can be easily applied to the corresponding error table for allowing or restricting select operations. The error table can include respective errors from different operations for the base table, providing a single location for the user to view errors for a base table. This attachment to the base table allows more efficient determination and performance of recovery actions because the error data is local to the base table.

Figure 9:
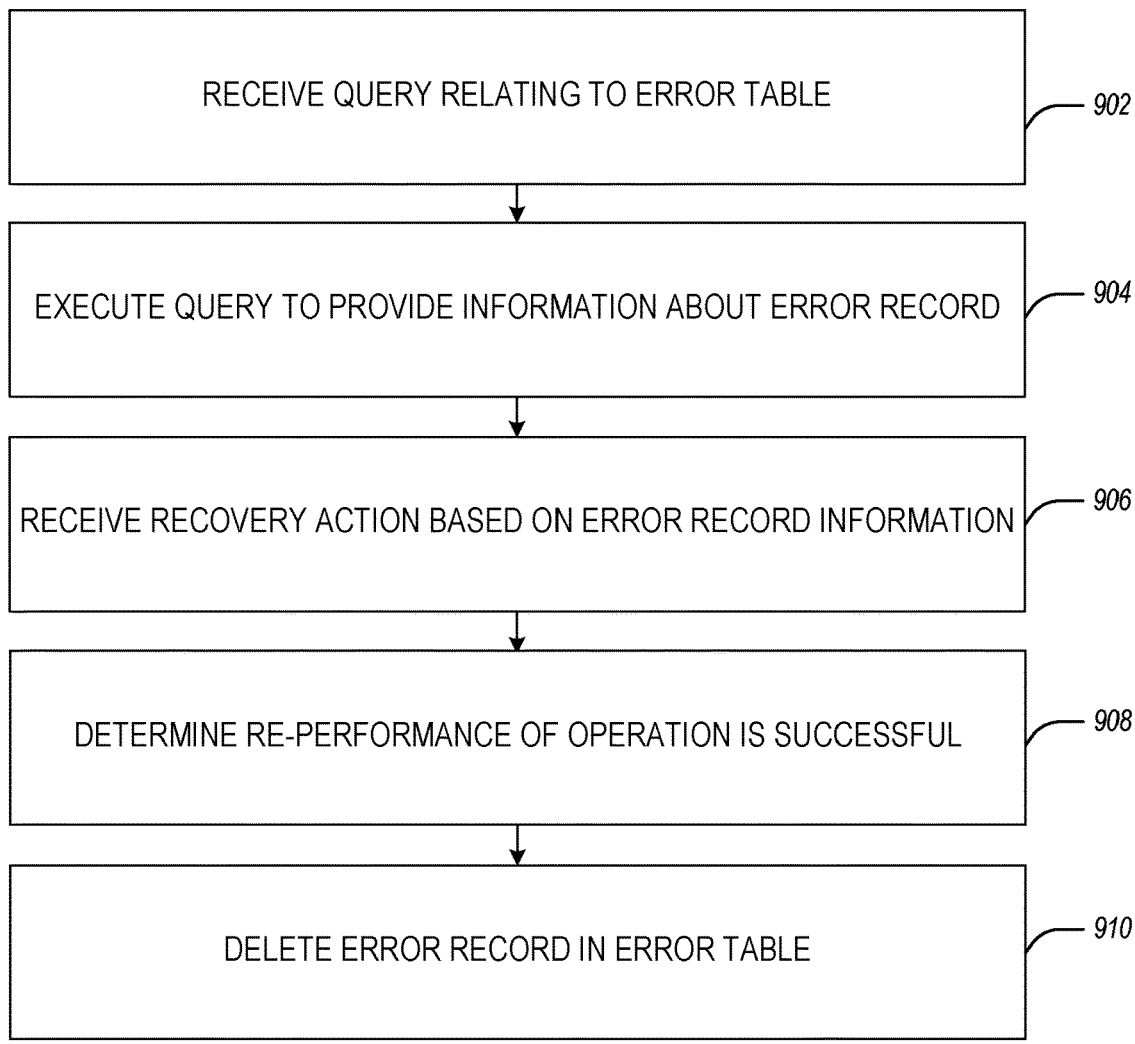
FIG. 9 is a flow diagram of a method for querying an error table and performing recovery actions, according to some example embodiments.

FIG. 9 is a flow diagram of method 900 for querying an error table and performing recovery actions, according to some example embodiments. Method 900 may be performed by one or more compute service managers (e.g., by a DQM) and execution platforms, as described above.

At operation 902, the system may receive one or more queries from a user relating to an error table attached to a base table. For example, the query may include a select, delete, truncate, and/or copy unload operation. In some examples, an error table is automatically created for every base table stored in the data system and can be accessible using a special syntax, such as "Table$errors" where "Table" represents the base table name. For example, for a table named "Products," the error table can be queried using the operation: SELECT * FROM Products$errors.

At operation 904, the system may execute the one or more queries from the user, providing context information relating to the error records cataloged in the error table. Consider a stock transaction example: an account performed an auto-ingestion operation for a file stored in an external cloud storage location to be ingested into a base table "stocks" in the data system. The file included one hundred rows relating to stock transactions, but 5 rows could not be ingested because of some error. One column in the file is a binary representation of respective stock transactions. A transform on that column including the binary representation is performed to extract information from the column (e.g., who made the trade, amount, timestamp, etc.). A user-defined function (UDF) can be invoked to extract the information. For 5 rows, the UDF failed causing the errors in the 5 rows.

In this example, the user may first query the error table for the "stocks" base table to determine how many rows could not be ingested: select count (*) from stocks$errors. The system would execute the select operation and return a value of 5 rows in this example. Next, the user can query the error table to determine the source of the errors for those 5 tables. For example, the user can view the error message for those 5 rows: select message from stocks$errors. The system can return error messages, which, for example, can be "UDF crashed; unable to parse data." The user can then query the error tables for the metadata for the 5 rows to determine the reason for the error: select record_metadata from "stocks$errors. Here, the system may return metadata where the UDF is failing. For example, the metadata may reveal that the binary representation of the 5 rows may have some encoding issue that is incompatible with the UDF.

At operation 906, the system may receive one or more recovery actions based on the information from the error table. The recovery actions may be manual (e.g., through code, graphical user interface, etc.) or automatic actions. For example, in the stock transaction example, the user may modify the UDF to account for the encoding issue in the 5 rows that encountered an error during ingestion. The system may then re-execute the operation that led to the error for the affected rows.

At operation 908, the system may check if the re-execution of the operation on the affected rows was successful (e.g., no new error records were inputted into the error table). At operation 910, the system may receive and execute a delete command from the user to delete the error records of the affected rows. In the stocks transaction example, the system may receive delete from stocks$errors where error_message="UDF crashed; unable to parse data." In some examples, deletions of corrected error records may be automatic.

For a materialized view/table, the error table is attached to the materialized table, not the upstream table from which the materialized table is created. A materialized view may be a declarative specification of a persistent query result that is automatically maintained and transparently utilized. In some examples, a materialized view may include a local copy of data located remotely or may include a subset of rows and/or columns (may be referred to as a "partition" or "micro-partition") of a base table or join result or may alternatively include a summary using an aggregate function. Materialized views may be generated by way of materialization, where the results of a query are cached similar to memorization of the value of a function in functional languages. Materialized views improve the performance of expensive queries by materializing and reusing common intermediate query results in a workload. Materialized views are utilized to improve the performance of queries at the expense of maintenance costs and increased storage requirements.

Consider an example of a materialized view being created for an upstream table. An error table may be attached to the materialized view/table. The upstream table may be updated (e.g., alter table upstream_table drop column id). This update to the upstream table may cause an error for the materialized view, because the materialized view may be unable to be refreshed. Thus, the user can query the error table to determine that the materialized view could not be refreshed because the upstream source has a column now missing because of the update to the upstream table. This information can be in the error message and error column fields of the error table. Given this information, the user can either repair the upstream table or modify the materialized view in light of the update to the upstream table. After the recovery action is performed, the error record from the error table can be deleted by the user.

The use-case scenario of external tables can involve the creation of an object inside the data system to represent the external table for the attachment of the error table. For example, a user of the data system may set up an external table outside of the data system but may want to query the data in the external table from the data system. The user may set a location in cloud storage to persist files, such as a S3 bucket. For the user to query the data from the data system, the data system may create an external table object ("et") in the data system representing the external table. Now consider an error occurring when the external table is queried. For example, data in the external table is improperly compressed. An error table can be attached to the external table object ("et") in the data system recording error data. The user can query the error table to determine the source and context of the error and perform appropriate recovery actions, such as overwriting the improperly compressed files or removing the files from the cloud storage. The user can then try to perform the operation on the external table again and determine if the operation can be performed without new errors. If no new errors occurred, the respective rows in the error table can be deleted.

The error tables, described herein, are populated in a transactional manner so that errors are consistently logged. For respective errors encountered, an error record is transactionally written into the corresponding error table. This reduces (or eliminates) missing error records for encountered errors.

Next, techniques for monitoring data quality in the data system are described. The techniques can be integrated into the data system (i.e., built-in). The techniques can involve continuous monitoring of the data using scheduled data metric operations. A library of data metric functions can be created and used across an organization (i.e., account) using the data system. The data metric functions can be used across multiple tables and columns enabling scalability and consistency. The data metric functions can be automatically performed in the background, making them manageable and seamless. A central location per account can be provided for storing the monitored metrics, which can be used for dashboarding, reporting, alerting, and trend analysis. The techniques can also involve on-demand (e.g., ad-hoc) metric monitoring.

Figure 10:
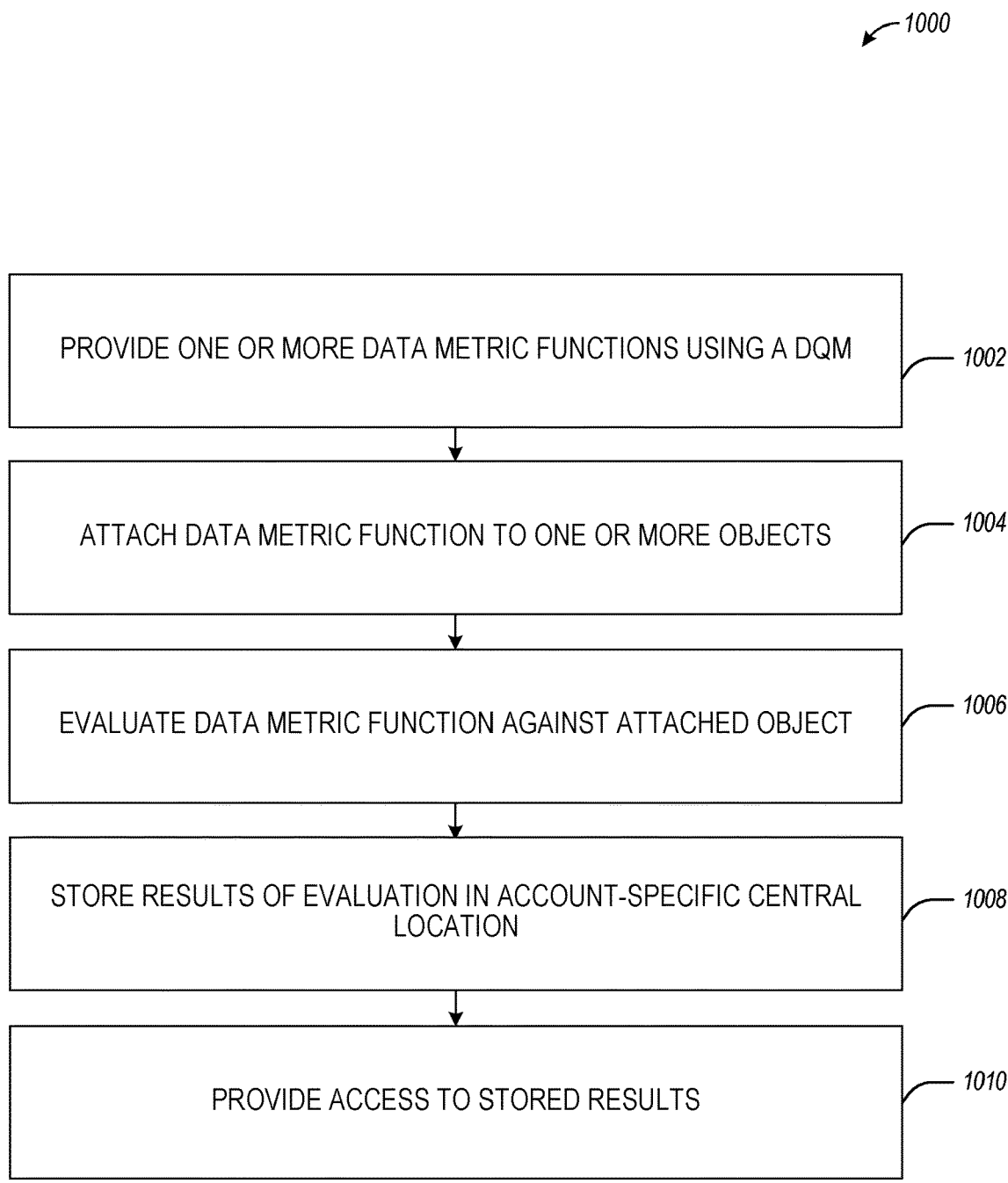
FIG. 10 is a flow diagram of a method for data metric monitoring performed by the DQM of FIG. 2, according to some example embodiments.

FIG. 10 is a flow diagram of method 1000 for data metric monitoring performed by the DQM of FIG. 2, according to some example embodiments. Method 1000 may be embodied in computer-readable instructions for execution by one or more hardware components (e.g., one or more processors used by the DQM 134) such that the operations of the method 1000 may be performed by components of network-based database system 102 (e.g., by DQM 134). Accordingly, method 1000 is described below, by way of example with reference thereto. However, it shall be appreciated that method 1000 may be deployed on various other hardware configurations and is not intended to be limited to deployment within the network-based database system 102.

At operation 1002, one or more data metric functions are provided (e.g., using DQM 134). Data metric functions can monitor respective metrics. Data metric functions can be defined as schema-level objects. Data metric function objects reside within the schema similar to tables, views, and other objects. For example, a data metric function can include an expression (e.g., SQL expression) to evaluate the quality of a table or view column. The SQL expression can be a SQL statement that returns a scalar value (e.g., select count_if(c is null from arg_t").

The data metric function can measure the quality of the column according to specified rules. The measured metrics can be used to perform validity checks expressed as a Boolean expression. Data metric functions can be flexible to support aggregating an entire table for the metric evaluation or using a subset of rows using condition columns, such as a timestamp column. Examples of data metric functions can include quality checks for data freshness, row counts, null counts, duplicate counts, mean/median/max, and other suitable data metrics. The user may have the appropriate privileges in the data system to create the data metric function as a schema-level object.

At operation 1004, a data metric function can be attached to one or more objects, such as tables. Because the data metric function is a schema-level object, a data metric function can be attached to multiple tables. Also, a table can have multiple data metrics attached to the table. Privilege control may be used to limit which users can attach data metric functions to tables. For example, ownership privilege of the object (e.g., table) and usage privilege of the metric function may be used to attach the metric function. In some examples, a role with account level "apply data metric" privilege may be allowed to attach a data metric function. To attach a metric function, the table owner role may have "execute data metric" account level privilege or usage privilege on the data metric function.

A data metric function can be associated with columns in an object (e.g., table, stream) by ordinal identification. Hence, when a column is renamed, the metric association with the renamed column remains valid. If, however, a column is dropped, the associated metric becomes invalid and cannot be evaluated. In some examples, a metric will automatically begin performing evaluations upon association. In some examples, a separate command may be used to begin performing evaluations after association.

At operation 1006, the data metric function is evaluated against the attached object (e.g., table). As described in further detail below, the data metric function evaluation may be performed based on a set schedule (e.g., every hour, every day). Also, as described in further detail below, the evaluation may be performed in a deterministic manner in some examples. In some examples, the evaluation may be performed using dynamic tables, as described in further detail below. Metric evaluation executes the metric function using the table on identified columns by invoking the metric function.

At operation 1008, the results of evaluating the metric function are stored in an account-specific central location. For example, the results may be pipelined into an account-specific database stored in the data system. In some examples, the results from various metric functions performed on various tables in an account are stored in the account-specific central location. Accounts in the database may have respective central locations where data metric function results are stored and accessible for tables associated with respective accounts. The results are pipelined into the account-specific central location so that only account users with the proper privileges have access to the results, maintaining security and privacy protocols.

The data metric function results may be stored using an event table schema. For example, the results may be recorded in an open telemetry format to allow for the more robust creation of dashboards and other result views by account users. For example, the schema for the results may include a timestamp column, which includes the time at which the metric is evaluated. The schema for the results may include a resource attribute column, which can include an object describing additional attributes of the metric, such as metric ID, metric name, etc. The schema for the results may also include columns for record type, record, and record attribute, which can include information about the attached object on which the metric was evaluated. The schema for the results can include a value column, which includes the result of the evaluation.

At operation 1010, access to the data metric function results stored in the account-specific central location is provided to account users with the proper privileges. In some examples, dashboards may be created to show relevant information from the metric function results using a user interface.

In some examples, a local view of the database storing the metric function results may be generated. The local view may be generated and managed by the data system, and the local view may be provided as a user object. The local view may include columns for: table_ID, table_name, table_schema, table_database, metric_ID, metric_version, metric_name, metric_schema, metric_database, metric_arguments, measurement_time, query_end_time, query_ID, reference_ID, and value.

Figure 11:
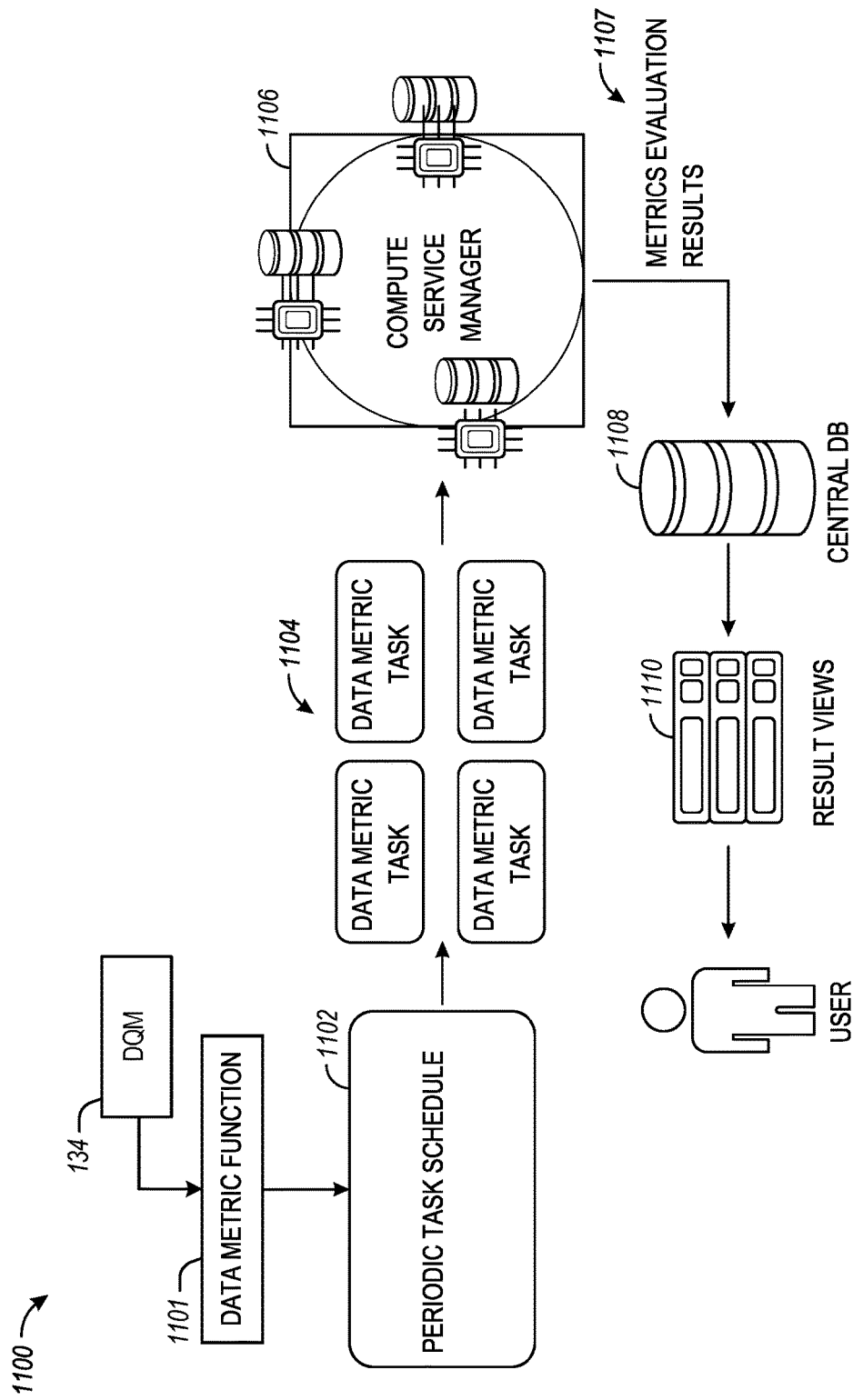
FIG. 11 is a simplified block diagram for scheduling evaluation of a metric function using the DQM of FIG. 2, according to some example embodiments.

FIG. 11 is a simplified block diagram 1100 for scheduling evaluation of a metric function using the DQM of FIG. 2, according to some example embodiments. In some aspects, DQM 134 can provide a data metric function 1101 to a periodic task scheduler 1102. The periodic task scheduler 1102 may generate at least one data metric task 1104 based on the data metric function 1101. The periodic task scheduler 1102 may be running in the background. The periodic task scheduler 1102 may scan a data metrics evaluation plan, which is defined by the data metric function, and schedule at least one data metric task 1104 accordingly. In some aspects, the periodic task scheduler 1102 can be part of the DQM 134.

The at least one data metric task 1104 may be provided to a compute service manager 1106 for execution. In some examples, the periodic task scheduler 1102 may be provided as a component in the compute service manager 1106. The compute service manager 1106 may execute the at least one data metric task 1104 to generate the metric evaluation results 1107.

In some examples, the at least one data metric task 1104 may be executed using serverless compute components. For example, a particular metric association (e.g., null_count on T1.C1) can be evaluated using a serverless compute task. A single serverless compute task execution can be used to evaluate multiple rules on the same table to improve query efficiency.

The metric evaluation results 1107 may be stored in a central database 1108 for the account (i.e., account-specific central location). The central database 1108 may be provided by the data system, but access may be limited to select account users to maintain security and privacy. A data metric pipeline may be executed using a serverless compute task to execute and store the metric evaluation results. A results view 1110 (e.g., local view) may be generated using the metric evaluation results stored in the central database 1108 to provide user access to the results.

The metric function may be evaluated in a deterministic manner. The metric function may be evaluated on a specified table version on the scheduled time using stored older versions of the table even if the metric function is executed at a later time as compared to the scheduled time. For example, the data system may take into consideration the workload on the data system in determining when to execute the scheduled metric function and can delay the execution of the metric function based on the workload. Consider an example: a data metric function is scheduled to be evaluated at 8:00 am, but at 8:00 am the workload on the data system may be above a capacity threshold (e.g., heavy workload). For example, multiple users of the data system may be performing resource-extensive operations. The data system may delay the execution of the metric function to 8:10 am. However, at 8:10 am, the data system may use a table version corresponding to the scheduled 8:00 am when executing the metric function. Older table versions may be stored in a data retention storage for a defined data retention time. Thus, the data system may retrieve the version of the table that existed at 8:00 am when executing the metric function at 8:10 am. The results may be pipelined to a central location of the account.

In some examples, a metric function may be evaluated using a dynamic table. Metric evaluation can be maintained incrementally using a dynamic table or other mechanisms, such as a materialized view. A dynamic table (or other incremental storing mechanism) can store incremental changed row information. The dynamic table can be refreshed to load changed row information from the last refresh time.

Figure 12:
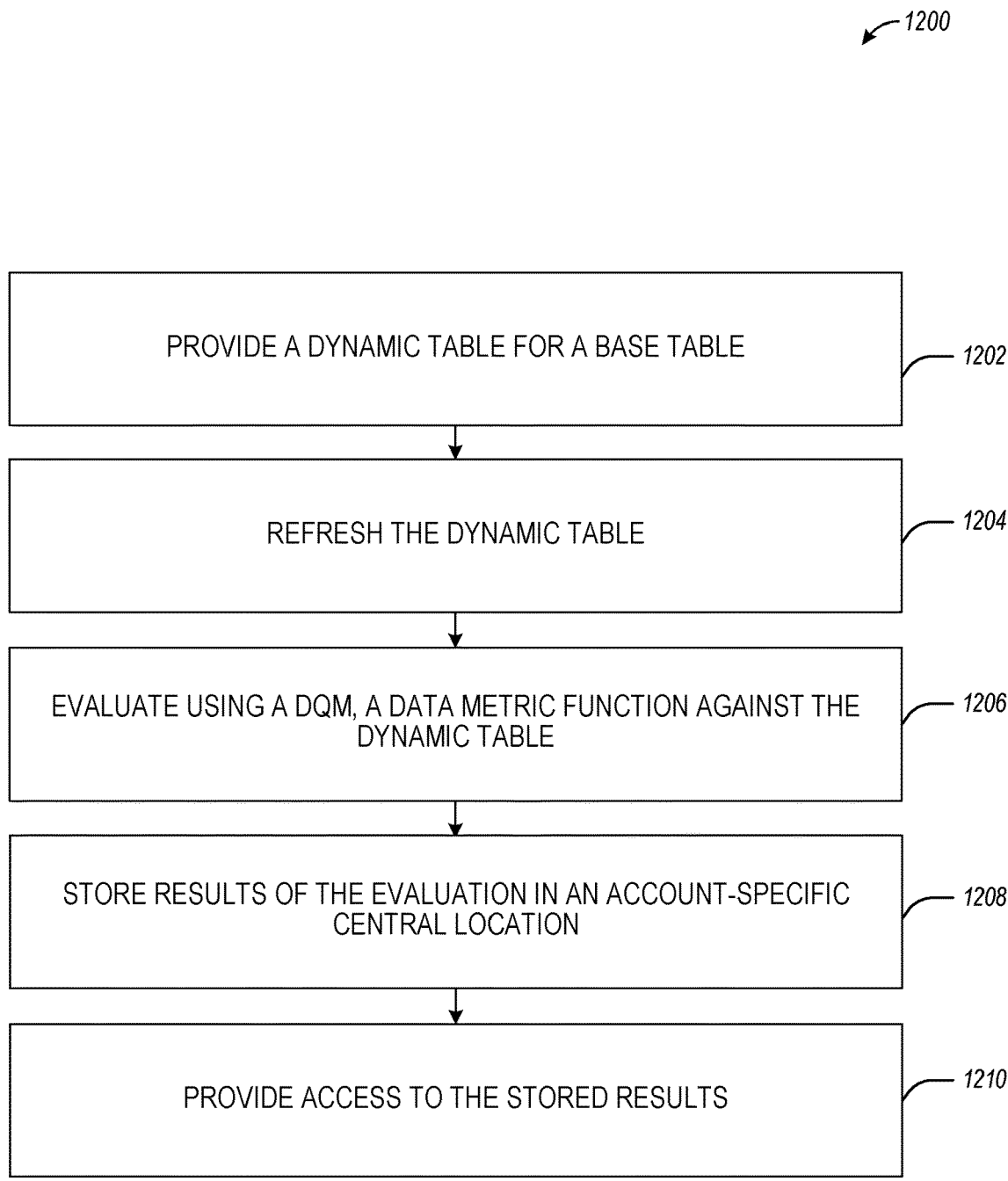
FIG. 12 is a flow diagram of a method for data metric monitoring performed by the DQM of FIG. 2 using a dynamic table, according to some example embodiments.

FIG. 12 is a flow diagram of method 1200 for data metric monitoring performed by the DQM of FIG. 2 using a dynamic table, according to some example embodiments. Method 1200 may be embodied in computer-readable instructions for execution by one or more hardware components (e.g., one or more processors) such that the operations of method 1200 may be performed by components of network-based database system 102 (e.g., by the DQM 134). Accordingly, method 1200 is described below, by way of example with reference thereto. However, it shall be appreciated that method 1200 may be deployed on various other hardware configurations and is not intended to be limited to deployment within the network-based database system 102.

At operation 1202, a dynamic table for a base table is provided. A metric function, as described herein, is attached to the base table. The dynamic table can store changed row information of the base table. The dynamic table can be created and maintained as a nested object of the base table. That is, the dynamic table may be a child object of the base table.

At operation 1204, the dynamic table is refreshed. The refresh can include loading newly changed row information of the base table since the last refresh of the dynamic table. In some examples, the previously changed row information stored in the dynamic table may be removed and the new information may be loaded in the dynamic table. The refresh of the dynamic table may be triggered by the schedule of the metric function. That is, the dynamic table may be refreshed at the scheduled execution time of the metric function evaluation.

At operation 1206, the metric function attached to the base table can be evaluated using the refreshed dynamic table (e.g., by the DQM 134). The use of dynamic tables can increase the speed and efficiency of metric function evaluation while lowering the cost of performing data metric evaluation at regular intervals. Instead of the metric function being evaluated against the entire base table, the metric function can be evaluated against the refreshed dynamic table, which includes only incremental changed row information, and therefore the amount of data in the dynamic table is less than the base table. Consider an example: an initial metric evaluation is performed on the base table including one hundred rows at time T1. By time T2, which is the next scheduled metric evaluation, one hundred additional rows have been added to the base table. Without dynamic tables, the metric function would be executed on the total of two hundred rows of the base table at time T2. However, with the use of a dynamic table, the number of rows to be scanned for metric evaluation can be reduced. Now, in the dynamic table use case scenario, the dynamic table at time T2 is refreshed to store changed row information of the added one hundred rows. The metric function now is executed on the one hundred new rows in the dynamic table instead of the total two hundred rows of the base table.

At operation 1208, the results of evaluating the metric function are stored in an account-specific central location using the techniques described herein. At operation 1210, access to the metric function results stored in the account-specific central location may be provided using the techniques described herein.

As described above, the data metric functions can be evaluated using a background process based on a schedule and data evaluation plan. However, creating and maintaining a library of data metric functions can also allow ad-hoc evaluation of the data metric functions. For example, data engineers can be building components in the data system to move data within an account and may wish to test the components in real-time.

In some embodiments, a dynamic table or a materialized view can be used to maintain the metrics generated by the data metric function (or data metric task). In this regard, a materialized view can be used instead of a dynamic table in the functionalities discussed in connection with any of FIG. 12-FIG. 15.

Figure 13:
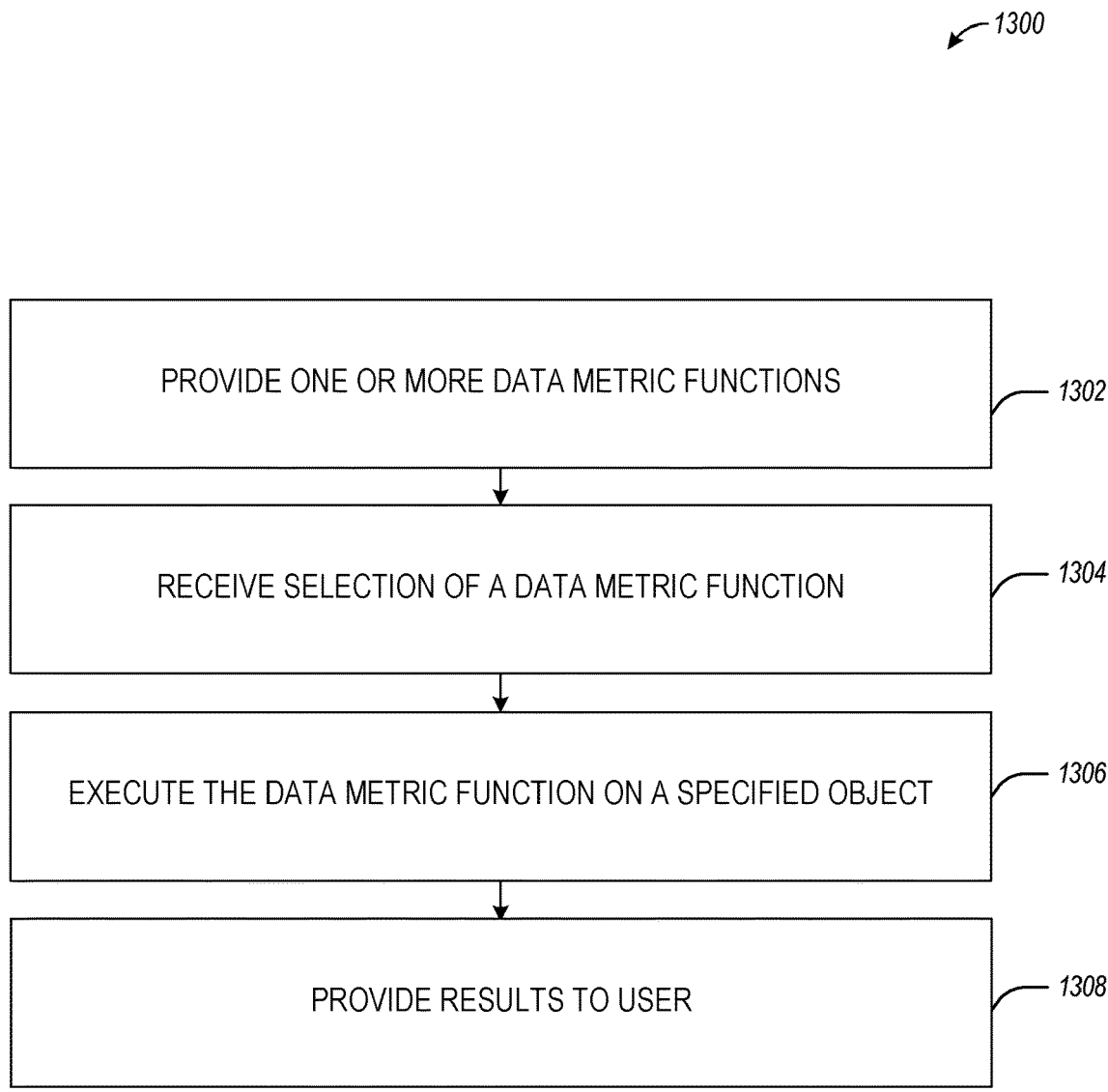
FIG. 13 is a flow diagram of a method for ad-hoc data metric monitoring performed by the DQM of FIG. 2, according to some example embodiments.

FIG. 13 is a flow diagram of method 1300 for ad-hoc data metric monitoring performed by the DQM of FIG. 2, according to some example embodiments. Method 1300 may be embodied in computer-readable instructions for execution by one or more hardware components (e.g., one or more processors) such that the operations of method 1300 may be performed by components of network-based database system 102 (e.g., by the DQM 134). Accordingly, method 1300 is described below, by way of example with reference thereto. However, it shall be appreciated that method 1200 may be deployed on various other hardware configurations and is not intended to be limited to deployment within the network-based database system 102.

At operation 1302, one or more data metric functions are provided. For example, a library of data metric functions may be provided. The data metric functions are defined as schema-level objects, as described herein.

At operation 1304, the data system can receive a selection of data metric functions from the library to execute on a specified object (e.g., table). The selection may be received from a user (e.g., data engineer) with the appropriate privileges as described herein.

At operation 1306, the selected data metric function can be executed like a query on the specified object (e.g., table). At operation 1308, the results of the data metric function execution can be provided to the user as query results. Instead of the results being pipelined to an account-specific central location when the data metric evaluation is performed in the background, the results are directly provided to the user for ad-hoc evaluation as query results.

Figure 14:
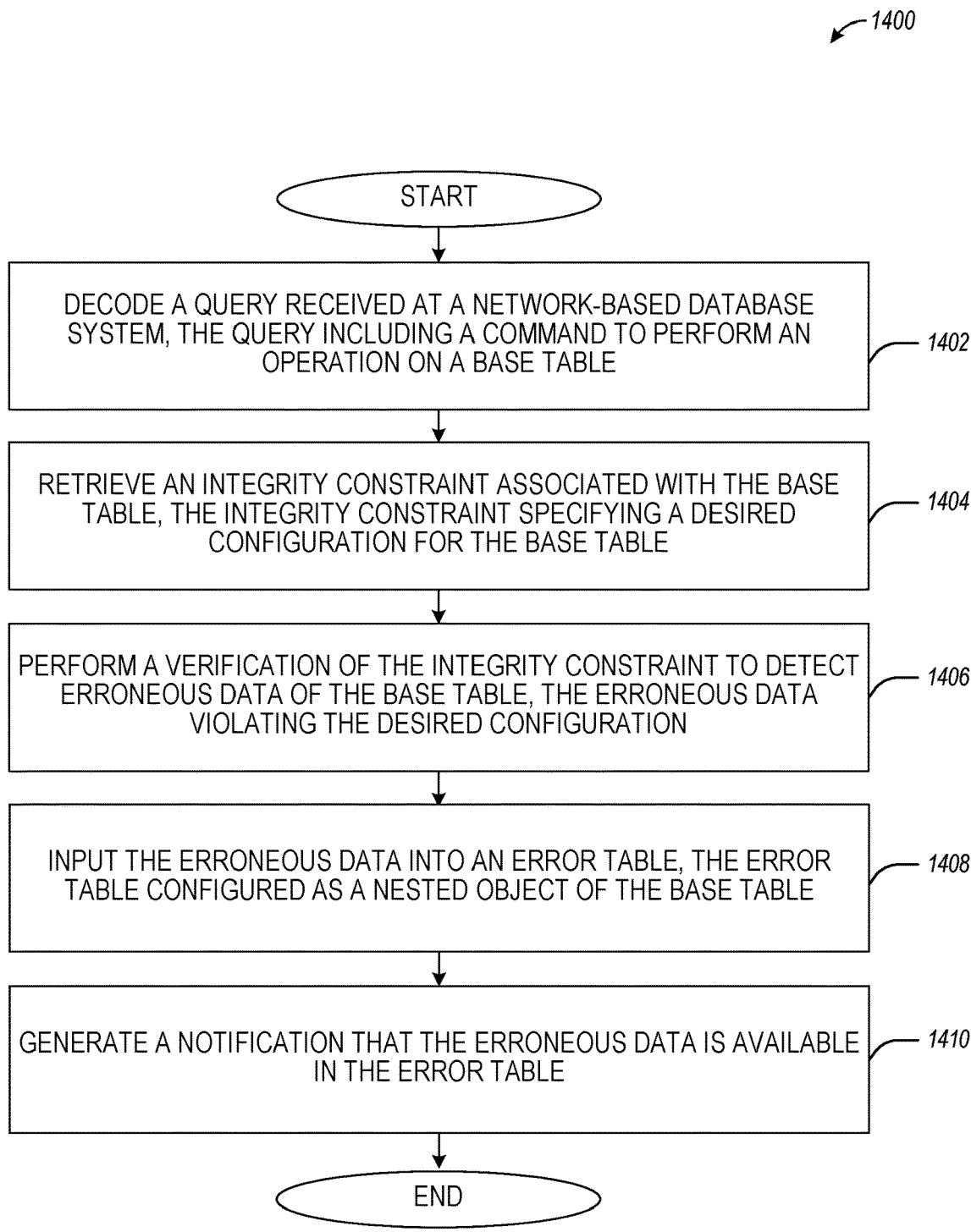
FIG. 14 is a flow diagram of a method for data quality management based on integrity constraint verification using error table logging, according to some example embodiments.

FIG. 14 is a flow diagram of method 1400 for data quality management based on integrity constraint verification using error table logging, according to some example embodiments. Method 1400 includes operations 1402, 1404, 1406, 1408, and 1410. By way of example and not limitation, method 1400 is described as being performed by DQM 134 or machine 1500 of FIG. 15 configured to perform disclosed functionalities. Any of the methods disclosed herein can be configured as computer-implemented methods performed within the network-based database system 102.

At operation 1402, a query received at a network-based database system is decoded. The query can include a command to perform an operation on a base table. For example, a query can be received in connection with data received at the network-based database system 102 via the data pipeline 515. In some aspects, the operation can be performed on a base table generated during the raw data processing stage 516 or the transformation processing stage 518.

At operation 1404, an integrity constraint associated with the base table is retrieved. For example, the integrity constraint can be a check constraint specifying a desired configuration for the base table.

At operation 1406, a verification of the integrity constraint is performed to detect erroneous data of the base table. For example, DQM 134 performs verification of the check constraint to detect the erroneous data which can include data violating the desired configuration of the constraint.

At operation 1408, the erroneous data is stored in an error table. For example, the erroneous data is stored in error table 136 which can be configured as a nested object of the base table.

At operation 1410, a notification that erroneous data is available in the error table can be generated and communicated to one or more users.

Figure 15:
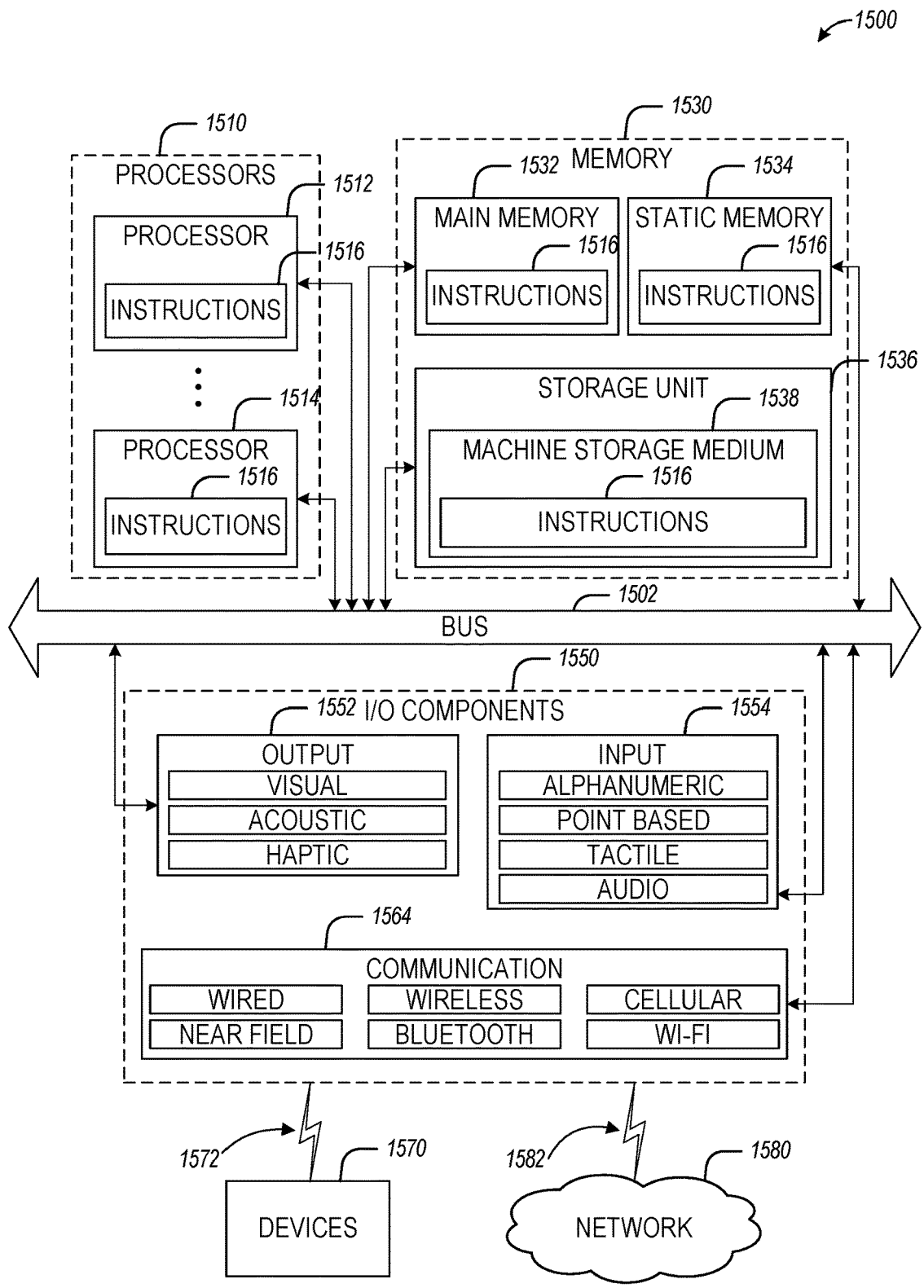
FIG. 15 illustrates a diagrammatic representation of a machine in the form of a computer system within which a set of instructions may be executed for causing the machine to perform any one or more of the methodologies discussed herein, according to some example embodiments.

FIG. 15 illustrates a diagrammatic representation of machine 1500 in the form of a computer system within which a set of instructions may be executed for causing machine 1500 to perform any one or more of the methodologies discussed herein, according to an example embodiment. Specifically, FIG. 15 shows a diagrammatic representation of machine 1500 in the example form of a computer system, within which instructions 1516 (e.g., software, a program, an application, an applet, an app, or other executable code) for causing machine 1500 to perform any one or more of the methodologies discussed herein may be executed. For example, instructions 1516 may cause machine 1500 to execute any one or more operations of the methods discussed herein above (or any other technique discussed herein, for example in connection with FIGS. 4-14). As another example, instructions 1516 may cause machine 1500 to implement one or more portions of the functionalities discussed herein. In this way, instructions 1516 may transform a general, non-programmed machine into a particular machine 1500 (e.g., the client device 114, the compute service manager 108, or a node in the execution platform 110) that is specially configured to carry out any one of the described and illustrated functions in the manner described herein. In yet another embodiment, instructions 1516 may configure the client device 114, the compute service manager 108, and/or a node in the execution platform 110 to carry out any one of the described and illustrated functions in the manner described herein, which functions can be configured or performed by the DQM 134.

In alternative embodiments, the machine 1500 operates as a standalone device or may be coupled (e.g., networked) to other machines. In a networked deployment, machine 1500 may operate in the capacity of a server machine or a client machine in a server-client network environment, or as a peer machine in a peer-to-peer (or distributed) network environment. Machine 1500 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines that individually or jointly execute instructions 1516 to perform any one or more of the methodologies discussed herein.

Machine 1500 includes processors 1510, memory 1530, and input/output (I/O) components 1550 configured to communicate with each other such as via a bus 1502. In some example embodiments, the processors 1510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1512 and a processor 1514 that may execute the instructions 1516. The term "processor" is intended to include multi-core processors 1510 that may comprise two or more independent processors (sometimes referred to as "cores") that may execute instructions 1516 contemporaneously. Although FIG. 15 shows multiple processors 1510, machine 1500 may include a single processor with a single core, a single processor with multiple cores (e.g., a multi-core processor), multiple processors with a single core, multiple processors with multiple cores, or any combination thereof.

The memory 1530 may include a main memory 1532, a static memory 1534, and a storage unit 1536, all accessible to the processors 1510 such as via the bus 1502. The main memory 1532, the static memory 1534, and the storage unit 1536 store the instructions 1516 embodying any one or more of the methodologies or functions described herein. The instructions 1516 may also reside, completely or partially, within the main memory 1532, within the static memory 1534, within machine storage medium 1538 of the storage unit 1536, within at least one of the processors 1510 (e.g., within the processor's cache memory), or any suitable combination thereof, during execution thereof by the machine 1500.

The I/O components 1550 include components to receive input, provide output, produce output, transmit information, exchange information, capture measurements, and so on. The specific I/O components 1550 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 1550 may include communication components 1564 operable to couple the machine 1500 to a network 1580 or devices 1570 via a coupling 1582 and a coupling 1572, respectively. For example, communication components 1564 may include a network interface component or another suitable device to interface with network 1580. In further examples, communication components 1564 may include wired communication components, wireless communication components, cellular communication components, and other communication components to provide communication via other modalities. The device 1570 may be another machine or any of a wide variety of peripheral devices (e.g., a peripheral device coupled via a universal serial bus (USB)). For example, as noted above, machine 1500 may correspond to any one of the client devices 114, the compute service manager 108, or the execution platform 110, and device 1570 may include the client device 114 or any other computing device described herein as being in communication with the network-based database system 102 or the cloud storage platform 104.

The various memories (e.g., 1530, 1532, 1534, and/or memory of the processor(s) 1510 and/or the storage unit 1536) may store one or more sets of instructions 1516 and data structures (e.g., software) embodying or utilized by any one or more of the methodologies or functions described herein. These instructions 1516, when executed by the processor(s) 1510, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 1580 or a portion of network 1580 may include a wireless or cellular network and coupling 1582 may be a Code Division Multiple Access (CDMA) connection, a Global System for Mobile communications (GSM) connection, or another type of cellular or wireless coupling. In this example, the coupling 1582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE)

standard, others defined by various standard-setting organizations, other long-range protocols, or other data transfer technology.

The instructions 1516 may be transmitted or received over the network 1580 using a transmission medium via a network interface device (e.g., a network interface component included in the communication components 1564) and utilizing any one of several well-known transfer protocols (e.g., hypertext transfer protocol (HTTP)). Similarly, instructions 1516 may be transmitted or received using a transmission medium via coupling 1572 (e.g., a peer-to-peer coupling or another type of wired or wireless network coupling) to device 1570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1516 for execution by the machine 1500, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: decoding a query received at a network-based database system, the query including a command to perform an operation on a base table; retrieving an integrity constraint associated with the base table, the integrity constraint specifying a desired configuration for the base table; performing a verification of the integrity constraint to detect erroneous data of the base table, the erroneous data violating the desired configuration; inputting the erroneous data into an error table, the error table configured as a nested object of the base table, and generating a notification that the erroneous data is available in the error table.

In Example 2, the subject matter of Example 1 includes subject matter where the integrity constraint is a check constraint and the desired configuration is at least one condition to be met by each row of a plurality of rows stored within the base table.

In Example 3, the subject matter of Example 2 includes the operations for performing the verification further comprising: parsing each row of the plurality of rows to determine whether the row satisfies the at least one condition; and designating the row as the erroneous data when the row does not satisfy the at least one condition.

In Example 4, the subject matter of Examples 1-3 includes, the operations further comprising: decoding a configuration message received from an account of a user of the network-based database system, the configuration message including the desired configuration of the integrity constraint.

In Example 5, the subject matter of Example 4 includes, the operations further comprising: determining a Boolean expression based on the configuration message.

In Example 6, the subject matter of Example 5 includes, the operations further comprising: configuring the integrity constraint as a check constraint, and the check constraint using the Boolean expression.

In Example 7, the subject matter of Examples 4-6 includes, the operations further comprising: determining one or more remediation actions based on the configuration message, wherein a first remediation action of the one or more remediation actions comprises the inputting of the erroneous data into the error table.

In Example 8, the subject matter of Example 7 includes, the operations further comprising: determining a second remediation action of the one or more remediation actions comprises canceling the operation on the base table.

In Example 9, the subject matter of Examples 1-8 includes, the operations further comprising: removing the erroneous data from the base table; and executing the operation on remaining data in the base table.

In Example 10, the subject matter of Examples 1-9 includes, the operations further comprising: updating the error table to include an identification of the integrity constraint and an expression of the desired configuration associated with the integrity constraint.

Example 11 is a method comprising: decoding, by at least one hardware processor, a query received at a network-based database system, the query including a command to perform an operation on a base table; retrieving an integrity constraint associated with the base table, the integrity constraint specifying a desired configuration for the base table; performing a verification of the integrity constraint to detect erroneous data of the base table, the erroneous data violating the desired configuration; inputting the erroneous data into an error table, the error table configured as a nested object of the base table, and generating a notification that the erroneous data is available in the error table.

In Example 12, the subject matter of Example 11 includes subject matter where the integrity constraint is a check constraint and the desired configuration is at least one condition to be met by each row of a plurality of rows stored within the base table.

In Example 13, the subject matter of Example 12 includes subject matter where the performing of the verification further comprises: parsing each row of the plurality of rows to determine whether the row satisfies the at least one condition; and designating the row as the erroneous data when the row does not satisfy the at least one condition.

In Example 14, the subject matter of Examples 11-13 includes, decoding a configuration message received from an account of a user of the network-based database system, and the configuration message including the desired configuration of the integrity constraint.

In Example 15, the subject matter of Example 14 includes, determining a Boolean expression based on the configuration message.

In Example 16, the subject matter of Example 15 includes, configuring the integrity constraint as a check constraint, the check constraint using the Boolean expression.

In Example 17, the subject matter of Examples 14-16 includes, determining one or more remediation actions based on the configuration message, wherein a first remediation action of the one or more remediation actions comprises the inputting of the erroneous data into the error table.

In Example 18, the subject matter of Example 17 includes, determining a second remediation action of the one or more remediation actions comprises canceling the operation on the base table.

In Example 19, the subject matter of Examples 11-18 includes, removing the erroneous data from the base table; and executing the operation on remaining data in the base table.

In Example 20, the subject matter of Examples 11-19 includes, updating the error table to include an identification of the integrity constraint and an expression of the desired configuration associated with the integrity constraint.

Example 21 is a computer-storage medium comprising instructions that, when executed by one or more processors of a machine, configure the machine to perform operations comprising: decoding a query received at a network-based database system, the query including a command to perform an operation on a base table; retrieving an integrity constraint associated with the base table, the integrity constraint specifying a desired configuration for the base table; performing a verification of the integrity constraint to detect erroneous data of the base table, the erroneous data violating the desired configuration; inputting the erroneous data into an error table, the error table configured as a nested object of the base table, and generating a notification that the erroneous data is available in the error table.

In Example 22, the subject matter of Example 21 includes subject matter where the integrity constraint is a check constraint and the desired configuration is at least one condition to be met by each row of a plurality of rows stored within the base table.

In Example 23, the subject matter of Example 22 includes, the operations for performing the verification further comprising: parsing each row of the plurality of rows to determine whether the row satisfies the at least one condition; and designating the row as the erroneous data when the row does not satisfy the at least one condition.

In Example 24, the subject matter of Examples 21-23 includes, the operations further comprising: decoding a configuration message received from an account of a user of the network-based database system, the configuration message including the desired configuration of the integrity constraint.

In Example 25, the subject matter of Example 24 includes, the operations further comprising: determining a Boolean expression based on the configuration message.

In Example 26, the subject matter of Example 25 includes, the operations further comprising: configuring the integrity constraint as a check constraint, and the check constraint using the Boolean expression.

In Example 27, the subject matter of Examples 24-26 includes, the operations further comprising: determining one or more remediation actions based on the configuration message, wherein a first remediation action of the one or more remediation actions comprises the inputting of the erroneous data into the error table.

In Example 28, the subject matter of Example 27 includes, the operations further comprising: determining a second remediation action of the one or more remediation actions comprises canceling the operation on the base table.

In Example 29, the subject matter of Examples 21-28 includes, the operations further comprising: removing the erroneous data from the base table; and executing the operation on remaining data in the base table.

In Example 30, the subject matter of Examples 21-29 includes, the operations further comprising: updating the error table to include an identification of the integrity constraint and an expression of the desired configuration associated with the integrity constraint.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one hardware processor; and
at least one memory storing instructions that cause the at least one hardware processor to perform operations comprising:
decoding a query received at a network-based database system, the query including a command to perform an operation on a base table;
retrieving an integrity constraint associated with the base table, the integrity constraint specifying a desired configuration for the base table;
performing a verification of the integrity constraint to detect erroneous data of the base table, the erroneous data violating the desired configuration;
inputting the erroneous data into an error table, the error table being configured as a dynamic table maintained as a nested object of the base table; and
generating a notification that the erroneous data is available in the error table.

2. The system of claim 1, wherein the integrity constraint comprises a check constraint and the desired configuration comprises at least one condition to be met by each row of a plurality of rows stored within the base table.

3. The system of claim 2, the operations for performing the verification further comprising:
parsing each row of the plurality of rows to determine whether the row satisfies the at least one condition; and
designating the row as the erroneous data when the row does not satisfy the at least one condition.

4. The system of claim 1, the operations further comprising:
decoding a configuration message received from an account of a user of the network-based database system, the configuration message including the desired configuration of the integrity constraint.

5. The system of claim 4, the operations further comprising:
determining a Boolean expression based on the configuration message.

6. The system of claim 5, the operations further comprising:
configuring the integrity constraint as a check constraint, the check constraint using the Boolean expression.

7. The system of claim 4, the operations further comprising:
determining one or more remediation actions based on the configuration message, wherein a first remediation action of the one or more remediation actions comprises the inputting of the erroneous data into the error table.

8. The system of claim 7, the operations further comprising:
determining a second remediation action of the one or more remediation actions comprises canceling the operation on the base table.

9. The system of claim 1, the operations further comprising:
removing the erroneous data from the base table; and
executing the operation on remaining data in the base table.

10. The system of claim 1, the operations further comprising:
updating the error table to include an identification of the integrity constraint and an expression of the desired configuration associated with the integrity constraint.

11. A method comprising:
decoding, by at least one hardware processor, a query received at a network-based database system, the query including a command to perform an operation on a base table;
retrieving an integrity constraint associated with the base table, the integrity constraint specifying a desired configuration for the base table;
performing a verification of the integrity constraint to detect erroneous data of the base table, the erroneous data violating the desired configuration;
inputting the erroneous data into an error table, the error table being configured as a dynamic table maintained as a nested object of the base table; and
generating a notification that the erroneous data is available in the error table.

12. The method of claim 11, wherein the integrity constraint comprises a check constraint and the desired configuration comprises at least one condition to be met by each row of a plurality of rows stored within the base table.

13. The method of claim 12, wherein the performing of the verification further comprises:
parsing each row of the plurality of rows to determine whether the row satisfies the at least one condition; and
designating the row as the erroneous data when the row does not satisfy the at least one condition.

14. The method of claim 11, further comprising:
decoding a configuration message received from an account of a user of the network-based database system, the configuration message including the desired configuration of the integrity constraint.

15. The method of claim 14, further comprising:
determining a Boolean expression based on the configuration message.

16. The method of claim 15, further comprising:
configuring the integrity constraint as a check constraint, the check constraint using the Boolean expression.

17. The method of claim 14, further comprising:
determining one or more remediation actions based on the configuration message, wherein a first remediation action of the one or more remediation actions comprises the inputting of the erroneous data into the error table.

18. The method of claim 17, further comprising:
determining a second remediation action of the one or more remediation actions comprises canceling the operation on the base table.

19. The method of claim 11, further comprising:
removing the erroneous data from the base table; and
executing the operation on remaining data in the base table.

20. The method of claim 11, further comprising:
updating the error table to include an identification of the integrity constraint and an expression of the desired configuration associated with the integrity constraint.

21. A computer-storage medium comprising instructions that, when executed by one or more processors of a machine, configure the machine to perform operations comprising:

decoding a query received at a network-based database system, the query including a command to perform an operation on a base table;

retrieving an integrity constraint associated with the base table, the integrity constraint specifying a desired configuration for the base table;

performing a verification of the integrity constraint to detect erroneous data of the base table, the erroneous data violating the desired configuration;

inputting the erroneous data into an error table, the error table being configured as a dynamic table maintained as a nested object of the base table; and generating a notification that the erroneous data is available in the error table.

22. The computer-storage medium of claim 21, wherein the integrity constraint comprises a check constraint and the desired configuration comprises at least one condition to be met by each row of a plurality of rows stored within the base table.

23. The computer-storage medium of claim 22, the operations for performing the verification further comprising:

parsing each row of the plurality of rows to determine whether the row satisfies the at least one condition; and designating the row as the erroneous data when the row does not satisfy the at least one condition.

24. The computer-storage medium of claim 21, the operations further comprising:

decoding a configuration message received from an account of a user of the network-based database system, the configuration message including the desired configuration of the integrity constraint.

25. The computer-storage medium of claim 24, the operations further comprising:

determining a Boolean expression based on the configuration message.

26. The computer-storage medium of claim 25, the operations further comprising:

configuring the integrity constraint as a check constraint, the check constraint using the Boolean expression.

27. The computer-storage medium of claim 24, the operations further comprising:

determining one or more remediation actions based on the configuration message, wherein a first remediation action of the one or more remediation actions comprises the inputting of the erroneous data into the error table.

28. The computer-storage medium of claim 27, the operations further comprising:

determining a second remediation action of the one or more remediation actions comprises canceling the operation on the base table.

29. The computer-storage medium of claim 21, the operations further comprising:

removing the erroneous data from the base table; and executing the operation on remaining data in the base table.

30. The computer-storage medium of claim 21, the operations further comprising:

updating the error table to include an identification of the integrity constraint and an expression of the desired configuration associated with the integrity constraint.

\* \* \* \* \*